(12) United States Patent
Bartlett et al.

(10) Patent No.: US 11,469,622 B2
(45) Date of Patent: Oct. 11, 2022

(54) MULTI-PHASE WIRELESS ELECTRIC FIELD POWER TRANSFER SYSTEM, TRANSMITTER AND RECEIVER

(71) Applicant: Solace Power Inc., Mount Pearl (CA)

(72) Inventors: Andrew Bartlett, Mount Pearl (CA); Chris Rouse, Mount Pearl (CA); Hamed Tebianian, Mount Pearl (CA)

(73) Assignee: Solace Power Inc., Mount Pearl (CA)

( * ) Notice: Subject to any disclaimer, the term of this patent is extended or adjusted under 35 U.S.C. 154(b) by 0 days.

(21) Appl. No.: 16/931,681

(22) Filed: Jul. 17, 2020

(65) Prior Publication Data

US 2021/0021160 A1 Jan. 21, 2021

Related U.S. Application Data

(60) Provisional application No. 62/875,043, filed on Jul. 17, 2019.

(51) Int. Cl.
*H02J 50/05* (2016.01)
*H02J 50/50* (2016.01)
*H02J 50/20* (2016.01)
*H02J 50/80* (2016.01)
*H04B 1/04* (2006.01)
*H02J 50/12* (2016.01)

(52) U.S. Cl.
CPC .............. *H02J 50/50* (2016.02); *H02J 50/05* (2016.02); *H02J 50/12* (2016.02); *H02J 50/20* (2016.02); *H02J 50/80* (2016.02); *H04B 1/04* (2013.01); *H04B 2001/0491* (2013.01)

(58) Field of Classification Search
CPC .. H02J 50/50; H02J 50/20; H02J 50/80; H02J 50/05; H02J 50/12; H02J 50/402; H04B 1/04; H04B 2001/0491; H04B 5/00
See application file for complete search history.

(56) References Cited

U.S. PATENT DOCUMENTS

| | | | | |
|---|---|---|---|---|
| 6,104,913 | A * | 8/2000 | McAllister | H04B 5/0012 340/5.4 |
| 6,861,944 | B1 * | 3/2005 | Hoepelman | A43B 3/0005 340/5.1 |
| 8,502,716 | B1 * | 8/2013 | Matsuura | H04L 27/368 341/120 |
| 8,755,454 | B2 * | 6/2014 | Sorrells | H01Q 21/061 375/295 |
| 9,859,863 | B2 * | 1/2018 | Maxim | H03H 7/0115 |
| 2010/0007214 | A1 * | 1/2010 | Howard | H02J 50/90 307/104 |
| 2011/0042063 | A1 * | 2/2011 | Diehl | H05B 6/108 166/60 |
| 2011/0279274 | A1 * | 11/2011 | Im | G06K 7/10316 340/572.7 |

(Continued)

*Primary Examiner* — Daniel Cavallari
*Assistant Examiner* — Brian K Baxter
(74) *Attorney, Agent, or Firm* — Harness, Dickey & Pierce, P.L.C.

(57) ABSTRACT

A transmitter comprises a multi-phase radio-frequency (RF) converter configured to output multiple sinusoidal RF power signals; and a multi-phase resonator configured to receive the multiple sinusoidal RF power signals and resonate multiple inductors and capacitive electrodes at a resonant frequency at multiple phases to transfer power via resonant electric field coupling.

20 Claims, 28 Drawing Sheets

(56) References Cited

U.S. PATENT DOCUMENTS

| | | | |
|---|---|---|---|
| 2011/0309686 A1* | 12/2011 | Scherbenski | H02J 7/025 307/104 |
| 2012/0007435 A1* | 1/2012 | Sada | H02J 50/12 307/84 |
| 2013/0147427 A1* | 6/2013 | Polu | B60L 53/36 320/108 |
| 2014/0300206 A1* | 10/2014 | Moes | H02J 7/025 307/104 |
| 2015/0318710 A1* | 11/2015 | Lee | H04B 5/0093 307/104 |
| 2015/0365052 A1* | 12/2015 | Barton | H03F 3/19 330/295 |
| 2015/0380946 A1* | 12/2015 | Polu | H02J 5/005 307/104 |
| 2016/0072308 A1* | 3/2016 | Nyberg | H02J 50/10 307/104 |
| 2016/0322867 A1* | 11/2016 | Polu | H02J 50/12 |
| 2017/0207665 A1* | 7/2017 | Polu | H02J 50/05 |
| 2018/0005752 A1* | 1/2018 | Takayama | H01F 27/324 |
| 2018/0054138 A1* | 2/2018 | Leung | H02J 5/005 |
| 2018/0166915 A1* | 6/2018 | Afridi | H02J 7/025 |
| 2018/0262015 A1* | 9/2018 | Nyberg | H02J 7/0042 |
| 2019/0140480 A1* | 5/2019 | Rouse | H02J 50/12 |
| 2019/0165612 A1* | 5/2019 | Polu | H03F 3/305 |
| 2020/0021138 A1* | 1/2020 | Yeo | H01Q 9/0414 |
| 2020/0099254 A1* | 3/2020 | Bartlett | H02J 50/12 |
| 2020/0203997 A1* | 6/2020 | Cove | H02J 50/05 |
| 2020/0203998 A1* | 6/2020 | Almudallal | H02J 50/70 |
| 2020/0227941 A1* | 7/2020 | Almudallal | H01Q 9/16 |
| 2020/0389054 A1* | 12/2020 | Vedady Moghadam Nanehkaran | H04B 7/0695 |

* cited by examiner

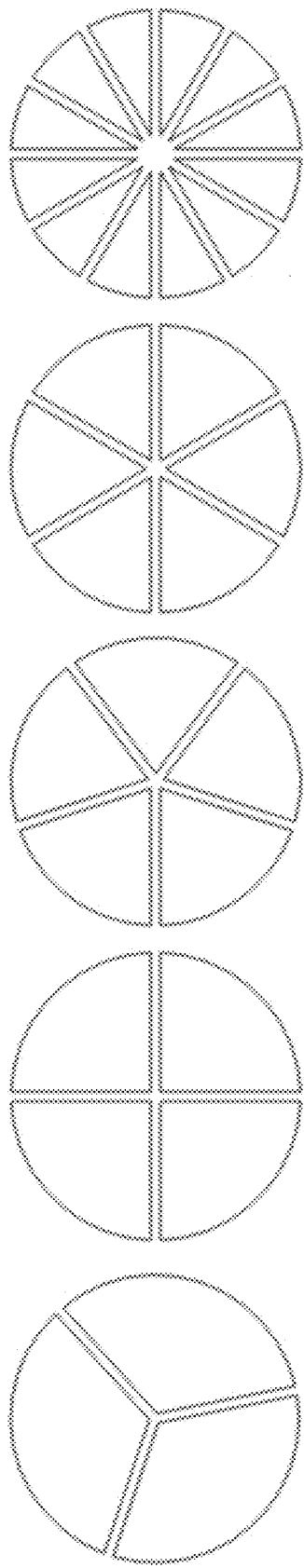

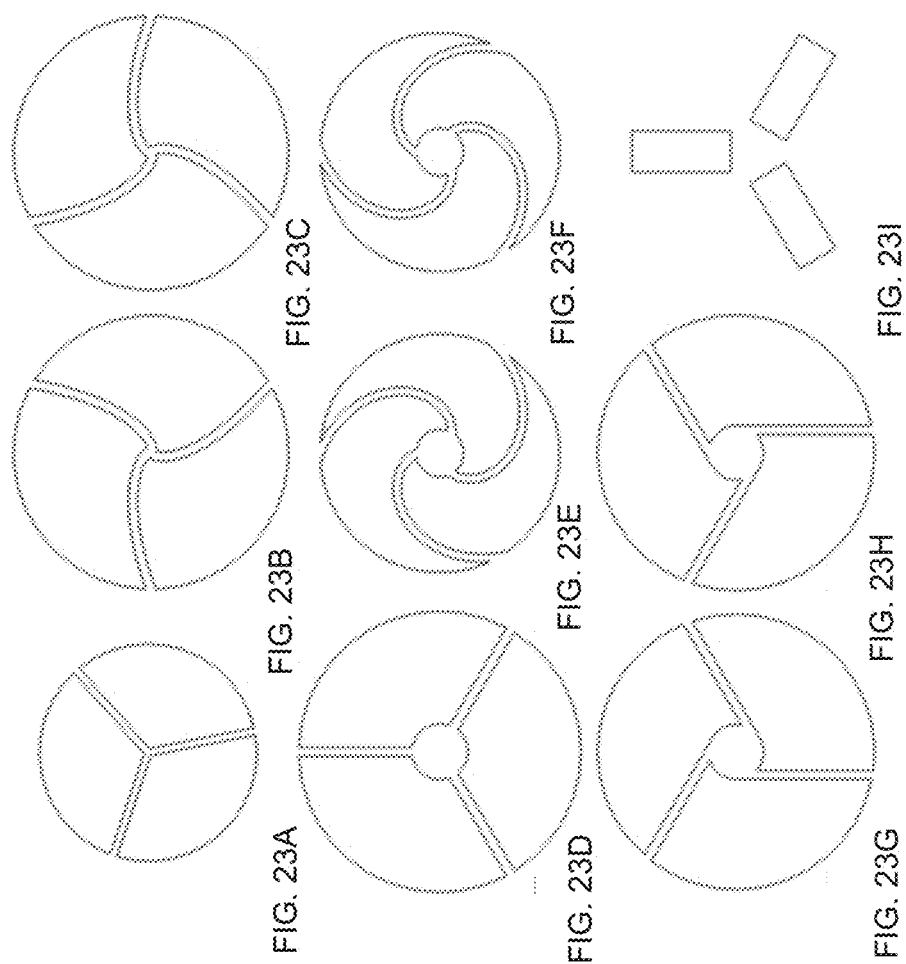

MULTI-PHASE WIRELESS ELECTRIC FIELD POWER TRANSFER SYSTEM, TRANSMITTER AND RECEIVER

RELATED APPLICATION

This application claims the benefit of U.S. Provisional Application No. 62/875,043 filed on Jul. 17, 2019, the entire content of which is incorporated herein by reference.

FIELD

The subject disclosure relates generally to wireless power transfer and in particular, to a wireless electric field power transfer system, and to a transmitter and receiver therefor.

BACKGROUND

A variety of wireless power transfer systems are known. A typical wireless power transfer system includes a power source electrically connected to a wireless power transmitter, and a wireless power receiver electrically connected to a load. In magnetic induction systems, the transmitter has an inductor that transfers electrical energy from the power source to an inductor of the receiver. Power transfer occurs due to coupling of magnetic fields between the inductors of the transmitter and receiver. The range of these magnetic induction systems is limited and the inductors of the transmitter and receiver must be in optimal alignment for effective power transfer. There also exist resonant magnetic systems in which power is transferred due to coupling of magnetic fields between the inductors of the transmitter and receiver. However, in resonant magnetic systems the inductors are resonated using at least one capacitor. The range of power transfer in resonant magnetic systems is increased over that of magnetic induction systems and alignment issues are rectified. While electromagnetic energy is produced in magnetic induction and resonant magnetic systems, the majority of power transfer occurs via the magnetic field. Little, if any, power is transferred via electric induction or resonant electric induction.

In electrical induction systems, the transmitter and receiver have capacitive electrodes. Power transfer occurs due to coupling of electric fields between the capacitive electrodes of the transmitter and receiver. Similar, to resonant magnetic systems, there exist resonant electric systems in which the capacitive electrodes of the transmitter and receiver are made resonant using at least one inductor. Resonant electric systems have an increased range of power transfer compared to electric induction systems and alignment issues are rectified. While electromagnetic energy is produced in electric induction and resonant electric systems, the majority of power transfer occurs via the electric field. Little, if any, power is transferred via magnetic induction or resonant magnetic induction.

Although wireless power transfer techniques are known, improvements are desired. It is therefore an object to provide a novel wireless electric field power transfer system, a transmitter and receiver therefor and a method of wirelessly transmitting power.

SUMMARY

It should be appreciated that this Summary is provided to introduce a selection of concepts in a simplified form that are further described below in the Detailed Description of Embodiments. This Summary is not intended to be used to limit the scope of the claimed subject matter.

Accordingly, in one aspect, there is provided a transmitter comprising: a multi-phase radio-frequency (RF) converter configured to output multiple sinusoidal RF power signals; and a multi-phase resonator configured to receive the multiple sinusoidal RF power signals and resonate multiple inductors and capacitive electrodes at a resonant frequency at multiple phases to transfer power via resonant electric field coupling.

In one or more embodiments, the capacitive electrodes are multi-fold rotationally symmetric. In one or more embodiments, an axis of the multi-fold rotational symmetry is normal to a major face of the capacitive electrodes about a centre of curvature of the capacitive electrodes.

In one or more embodiments, the multi-phase RF converter comprises a multi-phase RF inverter comprising multiple transistors, each transistor electrically connected to an inductor of the multi-phase transmit resonator.

In one or more embodiments, the transmitter further comprises a power source electrically connected to the multi-phase RF converter, wherein the power source is configured to output a direct current (DC) power signal.

In one or more embodiments, the multi-phase transmit resonator is balanced.

In one or more embodiments, the multi-phase transmit resonator comprises three inductors and three capacitive electrodes.

In another aspect, there is provided a receiver comprising: a multi-phase resonator comprising multiple inductors and capacitive electrodes configured to resonate at a resonant frequency to extract power via resonant electric field coupling and output multiple sinusoidal radio-frequency (RF) power signals, wherein the multiple inductors and capacitive electrodes resonate at multiple phases; and a multi-phase rectifier configured to receive the multiple sinusoidal RF power signals and output a direct current (DC) power signal.

In one or more embodiments, the capacitive electrodes are multi-fold rotationally symmetric. In one or more embodiments, an axis of the multi-fold rotational symmetry is normal to a major face of the capacitive electrodes about a centre of curvature of the capacitive electrodes.

In one or more embodiments, the multi-phase rectifier comprises multiple pairs of diodes, each pair of diodes electrically connected to an inductor of the multi-phase receive resonator.

In one or more embodiments, the receiver further comprises a load configured to receive the DC power signal output by the multi-phase rectifier.

In one or more embodiments, the multi-phase receive resonator is balanced.

In one or more embodiments, the multi-phase receive resonator comprises three inductors and three capacitive electrodes.

In another aspect, there is provided a system comprising: a transmitter comprising: a multi-phase radio-frequency (RF) converter configured to output multiple sinusoidal RF power signals; and a multi-phase transmit resonator configured to receive the multiple sinusoidal RF power signals and resonate multiple transmit inductors and transmit capacitive electrodes at a resonant frequency at multiple phases to transfer power via resonant electric field coupling; and a receiver comprising: a multi-phase receive resonator comprising multiple receive inductors and receive capacitive electrodes configured to resonate at the resonant frequency to extract power via resonant electric field coupling and output the multiple sinusoidal RF power signals, wherein the multiple receive inductors and receive capacitive electrodes resonate at the multiple phases; and a multi-phase rectifier configured to receive the multiple sinusoidal RF power signals and output a direct current (DC) power signal.

In one or more embodiments, the transmit capacitive electrodes are multi-fold rotationally symmetric. In one or more embodiments, an axis of the multi-fold rotational symmetry is normal to a major face of the capacitive electrodes about a centre of curvature of the capacitive electrodes.

In one or more embodiments, the receive capacitive electrodes are multi-fold rotationally symmetric. In one or more embodiments, an axis of the multi-fold rotational symmetry is normal to a major face of the capacitive electrodes about a centre of curvature of the capacitive electrodes.

In one or more embodiments, the multi-phase RF converter comprises a multi-phase RF inverter comprising multiple transistors, each transistor electrically connected to an inductor of the multi-phase transmit resonator.

In one or more embodiments, the transmitter further comprises a power source electrically connected to the multi-phase RF converter, wherein the power source is configured to output a direct current (DC) power signal.

In one or more embodiments, the multi-phase transmit resonator is balanced.

In one or more embodiments, the multi-phase transmit resonator comprises three transmit inductors and three transmit capacitive electrodes.

In one or more embodiments, the multi-phase rectifier comprises multiple pairs of diodes, each pair of diodes electrically connected to an inductor of the multi-phase receive resonator.

In one or more embodiments, the receiver further comprises a load configured to receive the DC power signal output by the multi-phase rectifier.

In one or more embodiments, the multi-phase receive resonator is balanced.

In one or more embodiments, the multi-phase receive resonator comprises three receive inductors and three receive capacitive electrodes.

In another aspect, there is provided a method of wirelessly transmitting power via electric field coupling, the method comprising: converting, at the multi-phase radio-frequency (RF) converter of any one of the described transmitters, an input power signal into multiple sinusoidal RF power signals; receiving the multiple sinusoidal RF power signals at the multi-phase resonator of the transmitter; resonating a transmit inductor and capacitive electrode pair of the multi-phase resonator of the transmitter to generate an electric field; and extracting power by the multi-phase RF resonator of any one of the described receivers, the multi-phase RF resonator of the receiver positioned within the generated electric field.

In one or more embodiments, the method further comprises: outputting received sinusoidal RF power signals to the multi-phase rectifier of the receiver; and rectifying the received sinusoidal RF power signals to a rectified signal.

In one or more embodiments, the rectified signal is a direct current (DC) power signal.

In one or more embodiments, the input power signal is a DC power signal.

In one or more embodiments, resonating the transmit inductor and capacitive electrode pair comprises resonating the pair at a resonant frequency of the multi-phase resonator of the transmitter.

In one or more embodiments, resonating the transmit inductor and capacitive electrode pair comprises resonating an $i^{th}$ transmit inductor and capacitive electrode pair at an $(i-1)*360/n$, where n is a number of sinusoidal RF power signals.

In the described embodiments, exemplary resonant frequencies include 13.56 MHz and 27.12 MHz.

In the described embodiments, the electric field coupling may be strongly (or tightly) or loosely coupled. Loosely coupled indicates that the electrodes of the transmitter and receiver are separated by air, i.e. an air core is present between transmitter and receiver.

The various elements of the described embodiments, may be combined in any number of ways as would be appreciated by one of skill in the art.

BRIEF DESCRIPTION OF THE DRAWINGS

Embodiments will now be described more fully with reference to the accompanying drawings, in which:

FIGS. 22A to 22E are plan views of other embodiments of the capacitive electrodes of the wireless power transfer system of FIG. 4;

FIGS. 23A to 23I are plan views of other embodiments of the capacitive electrodes of the wireless power transfer system of FIG. 5;

DETAILED DESCRIPTION OF EMBODIMENTS

Figure 1:
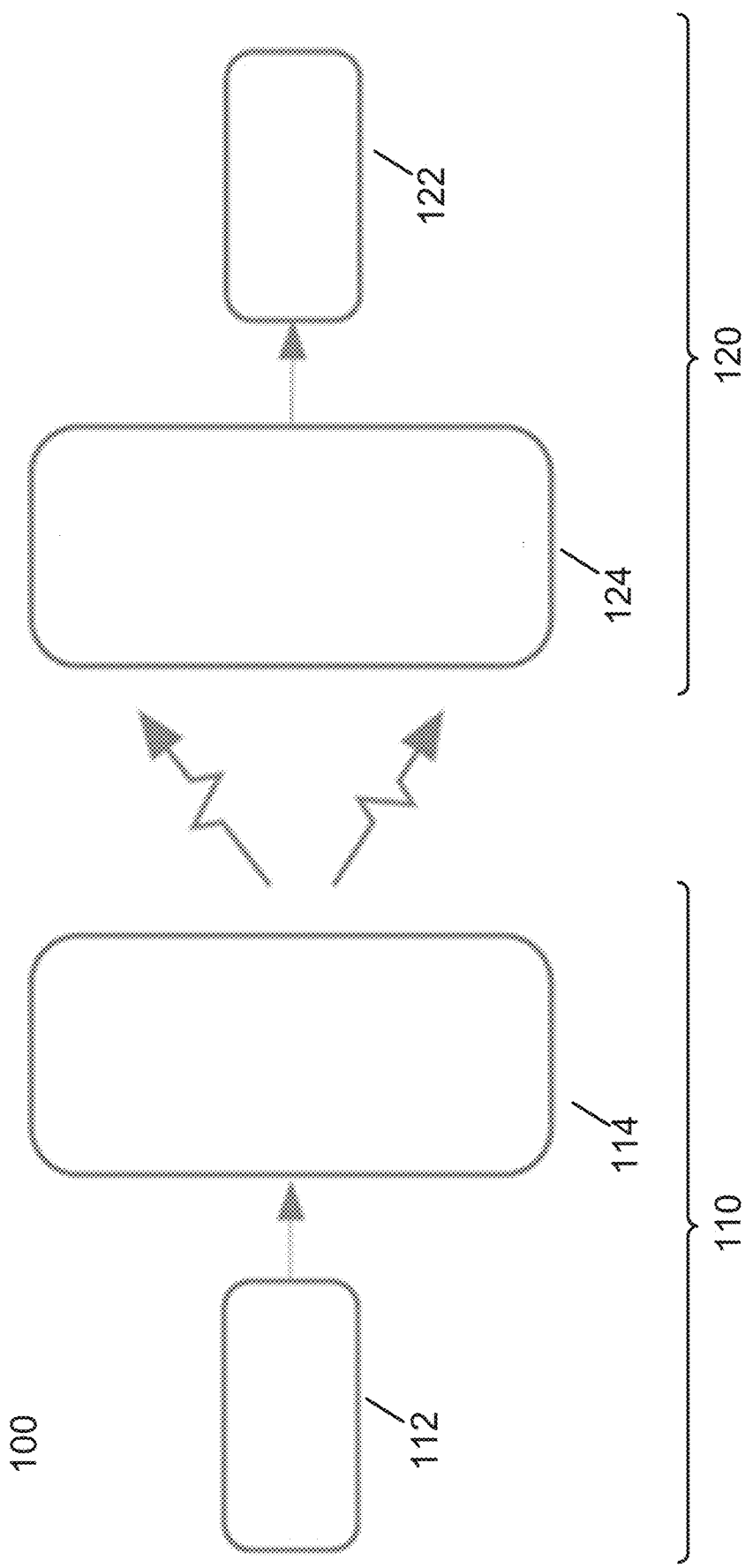
FIG. 1 a block diagram of a wireless power transfer system.

The foregoing summary, as well as the following detailed description of certain embodiments will be better understood when read in conjunction with the accompanying drawings. As will be appreciated, like reference characters are used to refer to like elements throughout the description and drawings. As used herein, an element or feature recited in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the recited elements or features of that one example or one embodiment. Moreover, unless explicitly stated to the contrary, examples or embodiments "comprising", "having" or "including" an element or feature or a plurality of elements or features having a particular property may further include additional elements or features not having that particular property. Also, it will be appreciated that the terms "comprises", "has" and "includes" mean "including but not limited to" and the terms "comprising", "having" and "including" have equivalent meanings.

As used herein, the term "and/or" can include any and all combinations of one or more of the associated listed elements or features.

It will be understood that when an element or feature is referred to as being "on", "attached" to, "connected" to, "coupled" with, "contacting", etc. another element or feature, that element or feature can be directly on, attached to, connected to, coupled with or contacting the other element or feature or intervening elements may also be present. In contrast, when an element or feature is referred to as being, for example, "directly on", "directly attached" to, "directly connected" to, "directly coupled" with or "directly contacting" another element of feature, there are no intervening elements or features present.

It will be understood that spatially relative terms, such as "under", "below", "lower", "over", "above", "upper", "front", "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately", "substantially", "generally", "about" and the like represent an amount close to the stated amount that still performs the desired function or achieves the desired result. For example, the terms "approximately" and "about" may refer to an amount that is within engineering tolerances that would be readily appreciated by a person skilled in the art, e.g. within less than 10% of, within less than 5% of, within less than 1% of, within less than 0.1% of, or within less than 0.01% of the stated amount.

FIG. 1 shows a wireless power transfer system generally identified by reference numeral 100. The wireless power transfer system 100 comprises a transmitter 110 comprising a power source 112 electrically connected to a transmit element 114, and a receiver 120 comprising a receive element 124 electrically connected to a load 122. Power is transferred from the power source 112 to the transmit element 114. The power is transferred from the transmit element 114 to the receive element 124 via resonant or non-resonant electric or magnetic field coupling. The power is transferred from the receive element 124 to the load 122.

Figure 2:
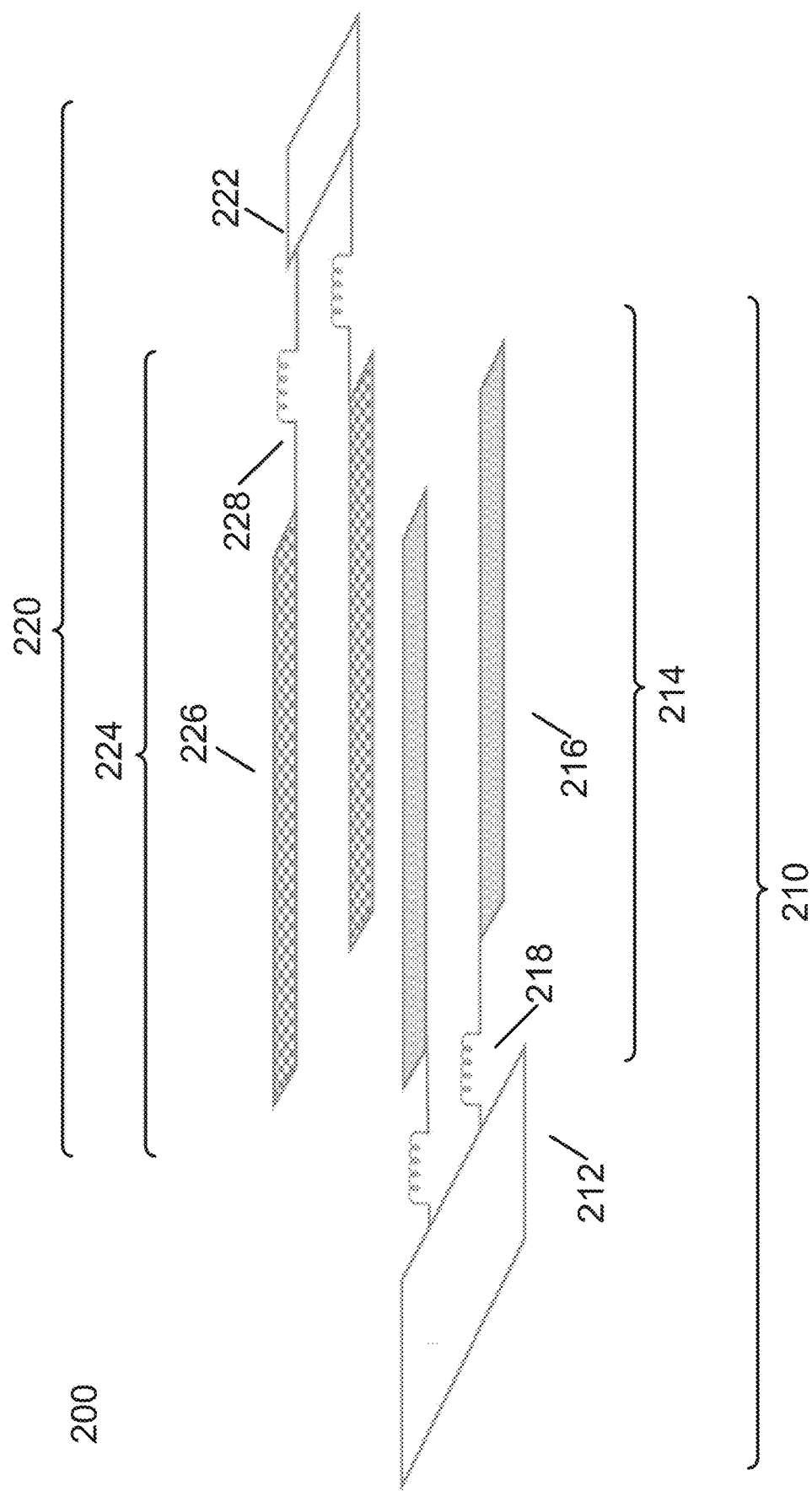
FIG. 2 is a schematic layout of a wireless resonant electric field power transfer system.

In one example embodiment, the wireless power transfer system may take the form of a resonant electric field wireless power transfer system. FIG. 2 shows a resonant electric field wireless power transfer system generally identified by reference numeral 200 such as that described in U.S. Pat. No. 9,653,948 to Polu et al. filed on Sep. 7, 2012, the relevant portions of which are incorporated herein by reference.

The resonant electric field wireless power transfer system 200 comprises a transmitter 210 comprising a power source 212 electrically connected to a transmit resonator 214. The transmit resonator 214 comprises a pair of laterally spaced, elongate transmit capacitive electrodes 216, each of which is electrically connected to the power source 212 via a high quality factor (Q) transmit inductor 218. The system 200 further comprises a receiver 220 comprising a receive resonator 224 electrically connected to a load 222. The receive resonator 224 is tuned to the resonant frequency of the transmit resonator 214. The receive resonator 224 comprises a pair of laterally spaced, elongate receive capacitive electrodes 226, each of which is electrically connected to the load 222 via a high Q receive inductor 228.

In this embodiment, the inductors 218 and 228 are ferrite core inductors. One of skill in the art however will appreciate that other cores are possible.

In this embodiment, each transmit and receive capacitive electrode 216 and 226 comprises an elongate element formed of electrically conductive material. The transmit capacitive electrodes 216 are coplanar. The receive capacitive electrodes 226 are coplanar. In this embodiment, the transmit capacitive electrodes 216 and the receive capacitive electrodes 226 are in parallel planes. In this embodiment, the transmit capacitive electrodes 216 and the receive capacitive electrodes 226 are in the form of generally rectangular, planar plates.

While the transmit capacitive electrodes 216 and receive capacitive electrodes 226 have been described as laterally spaced, elongate electrodes, one of skill in the art will appreciate that other configurations are possible including, but not limited to, concentric, coplanar, circular, elliptical, disc, etc., electrodes. Other suitable electrode configurations are described in U.S. Pat. No. 9,979,206 to Nyberg et al. filed on Sep. 4, 2015, the relevant portions of which are incorporated herein by reference.

While the inductors 218 and 228 are shown as being connected in series to the power source 212 and the load 222, respectively, in FIG. 2, one of skill in the art will appreciate that the inductors 218 and 228 may be connected to the power source 212 and the load 222, respectively, in parallel.

During operation, power is transferred from the power source 212 to the transmit capacitive electrodes 216 via the high Q transmit inductors 218. In particular, the power signal from the power source 212 that is transmitted to the transmit capacitive electrodes 216 via the high Q transmit inductors 218 excites the transmit resonator 214 causing the transmit resonator 214 to generate an electric field. When the receiver 220, which is tuned to the same resonant frequency as the transmitter 210, is placed within the resonant electric field, the receive resonator 224 extracts power from the transmit resonator 214 via resonant electric field coupling. The extracted power is then transferred from the receive resonator 224 to the load 222. As the power transfer is highly resonant, the transmit and receive capacitive electrodes 216 and 226, respectively, need not be as close together or as well aligned as is the case with the non-resonant electric field power transfer system. While the transmit resonator 214 may generate a magnetic field, little, if any, power is transmitted via magnetic field coupling.

Figure 3:
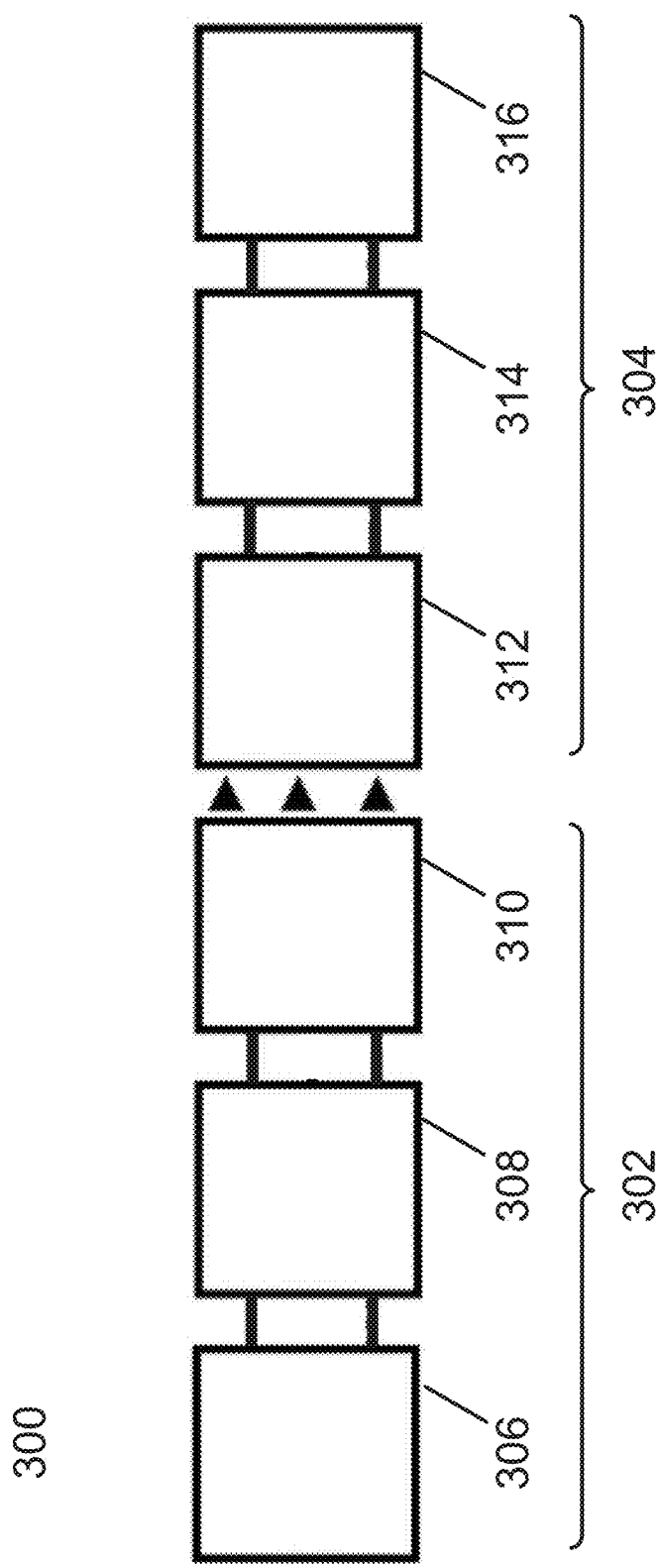
FIG. 3 is a block diagram of a wireless power transfer system in accordance with an aspect of the disclosure.

Turning now to FIG. 3, a block diagram of a wireless power transfer system in accordance with an aspect of the disclosure generally identified by reference numeral 300. The wireless power transfer system 300 comprises a transmitter 302 and a receiver 304. The transmitter 302 is configured to transfer power to the receiver 304 via resonant electric field coupling as will be described. The receiver 304 is configured to extract power from the transmitter 302 via resonant electric field coupling as will be described.

The transmitter 302 comprises a power source 306, a multi-phase RF converter 308 and a multi-phase transmit resonator 310. The power source 306 is electrically connected to the multi-phase RF converter 308. The power source 306 is configured to generate a direct current (DC) power signal. The power source 306 is configured to output the DC power signal to the multi-phase RF converter 308. The multi-phase RF converter 308 is electrically connected to the power source 306. The multi-phase RF converter 308 is electrically connected to the multi-phase transmit resonator 310. The multi-phase RF converter 308 is configured to convert the DC power signal into n sinusoidal RF power signals, where n is a positive integer greater than 2. In this embodiment, the multi-phase RF converter 308 is a multi-phase RF inverter. The sinusoidal RF power signals are shifted out of phase with each other. Each sinusoidal RF power signal is shifted 360/n degrees out of phase from successive sinusoidal RF power signals. The phases are distributed such that when the first signal is at 0 degrees, the second signal is at 360/n degrees, the third signal is at $2*360/n$ degrees and the $i^{th}$ signal is at $(i-1)*360/n$ degrees. The n sinusoidal RF power signals are output from the multi-phase RF converter 308 to the multi-phase transmit resonator 310. The multi-phase transmit resonator 310 is configured to generate an electric field and to transfer power via resonant electric field coupling as will be described. While a magnetic field may also be generated, little, if any, power is transferred via resonant or non-resonant magnetic field coupling. The multi-phase transmit resonator 310 comprises n electrode/inductor pairs as will be described.

The receiver 304 comprises a multi-phase receive resonator 312, a multi-phase rectifier 314 and a load 316. The multi-phase receive resonator 312 is configured to extract power from the multi-phase transmit resonator 310 via resonant electric field coupling as will be described. While a magnetic field may also be present, little, if any, power is extracted via resonant or non-resonant magnetic field coupling. The multi-phase receive resonator 312 is electrically connected to the rectifier 314. The multi-phase receive resonator 312 comprises multiple capacitive electrode/inductor pairs as will be described. The multi-phase receive resonator 312 comprises n electrode/inductor pairs. The multi-phase receive resonator 312 is configured to output multiple sinusoidal RF power signals to the multi-phase rectifier 314. The multi-phase receive resonator 312 is configured to output n sinusoidal RF power signals to the multi-phase rectifier 314. The sinusoidal RF power signals are shifted out of phase with each other. Each sinusoidal RF power signal is shifted 360/n degrees out of phase from the other sinusoidal RF power signals. The phases are distributed such that when the first signal is at 0 degrees, the second signal is at 360/n degrees, the third signal is at 2*360/n degrees and the $i^{th}$ signal is at (i−1)*360/n degrees. The multi-phase rectifier 314 is configured to convert the received n sinusoidal RF power signals into a DC power signal. The multi-phase rectifier 314 is electrically connected to the load 316. The multi-phase rectifier 314 outputs the DC power signal to the load 316. The load 316 is electrically connected to the multi-phase rectifier 314. The load 316 receives the DC power signal from the multi-phase rectifier 314.

Figure 4:
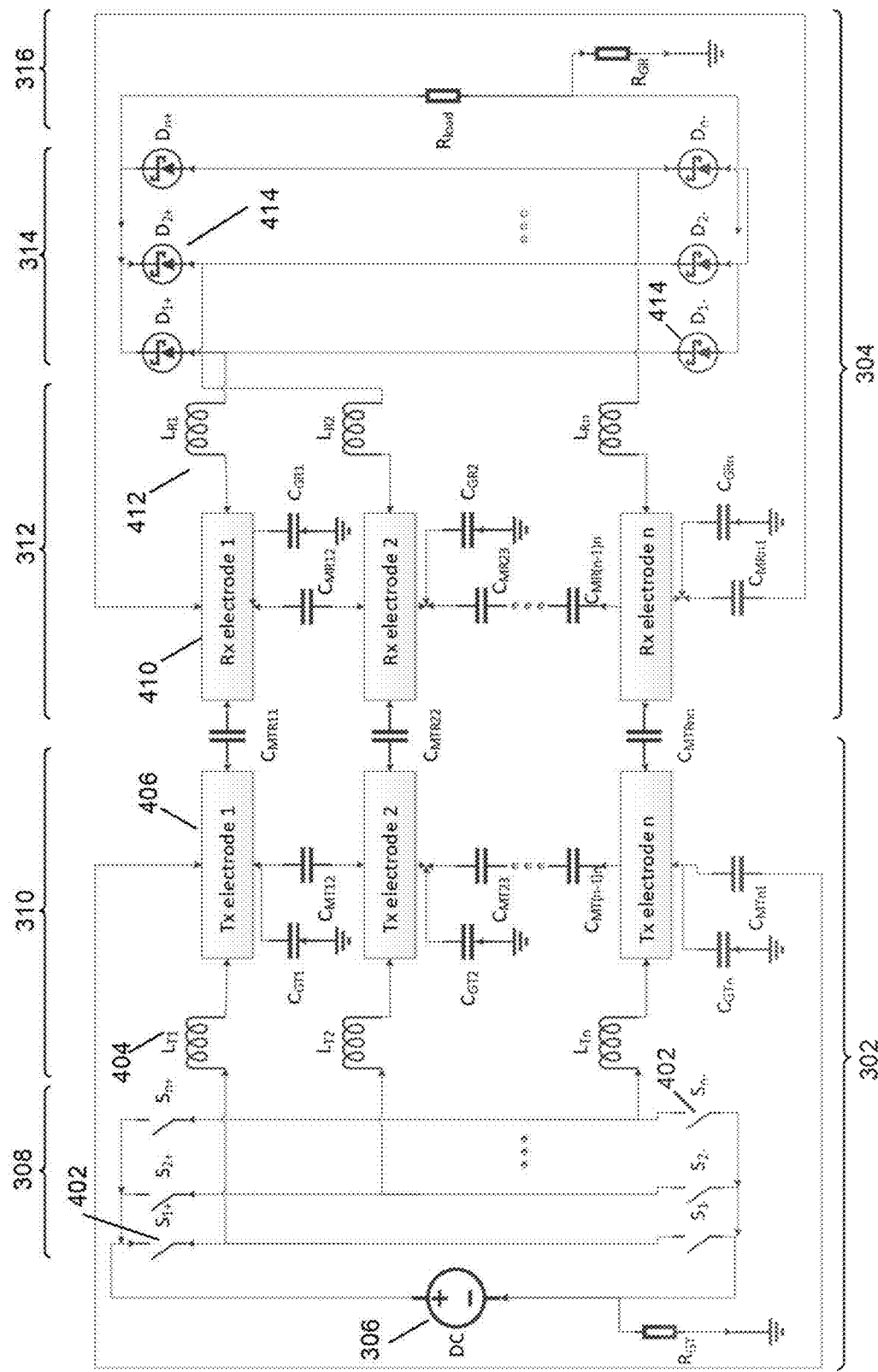
FIG. 4 is a schematic layout of the wireless power transfer system of FIG. 3.

Turning now to FIG. 4, a circuit diagram of the wireless power transfer system 300 is shown. As previously stated, the wireless power transfer system 300 comprises the transmitter 302 and the receiver 304. The transmitter 302 comprises the power source 306, the multi-phase RF converter 308 and the multi-phase transmit resonator 310.

As previously stated, the power source 306 is configured to generate a DC power signal. The power source 306 is configured to output the DC power signal to the multi-phase RF converter 308.

The multi-phase RF converter 308 is configured to convert the DC power signal into n sinusoidal RF power signals. The multi-phase RF converter 308 comprises n pairs of switches 402 and a controller (not shown). The pairs of switches 402 are arranged in parallel. Each pair of switches 402 outputs a sinusoidal RF power signal. Each sinusoidal RF power signal is shifted 360/n degrees out of phase from the other sinusoidal RF power signals. The phases are distributed such that when the first signal is at 0 degrees, the second signal is at 360/n degrees, the third signal is at 2*360/n degrees and the $i^{th}$ signal is at (i−1)*360/n degrees. The n sinusoidal RF power signals are output from the multi-phase RF converter 308 to the multi-phase transmit resonator 310.

In this embodiment, the switches 402 are metal-oxide semiconductor field-effect transistors (MOSFETs). In another embodiment, the switches 402 are wide bandgap devices (WBDs). In one embodiment, the WBDs are eGaN field-effect transistors (FETs). The controller is configured to control switching of the switches 402. In this embodiment, the controller is a digital signal processor (DSP). The DSP is configured to send gate signals to the switches 402. The gate signals are phase shifted such that the multi-phase RF converter 308 performs as a multi-phase voltage source with corresponding output voltage. Specifically, the $i^{th}$ gate signal is at (i−1)*360/n phase.

As previously stated, the multi-phase transmit resonator 310 is configured to generate an electric field and to transfer power via resonant electric field coupling as will be described. While a magnetic field may also be generated, little, if any, power is transferred via resonant or non-resonant magnetic field coupling. The multi-phase transmit resonator 310 comprises n transmit inductors 404 and n transmit capacitive electrodes 406. Each transmit inductor 404 is electrically connected to a transmit capacitive electrode 406. Each transmit inductor 404 is electrically connected between a pair of switches 402 of the multi-phase RF converter 308. Specifically, the first transmit inductor 404 is electrically connected to the first transmit capacitive electrode 406. The first transmit inductor 404 is electrically connected between the first pair of switches 402 of the multi-phase RF converter 308. Similarly, the $i^{th}$ transmit inductor 404 is electrically connected to the $i^{th}$ transmit capacitive electrode 406. The $i^{th}$ transmit inductor 404 is electrically connected between the $i^{th}$ pair of switches 402 of the multi-phase RF converter 308. The $i^{th}$ transmit capacitive electrode 406 and inductor 404 pair is configured to resonate at a resonant frequency of the multi-phase transmit resonator 310 at a phase of (i−1)*360/n degrees to generate an electric field.

The receiver 304 comprises the multi-phase receive resonator 312, the multi-phase rectifier 314 and the load 316. The multi-phase receive resonator 312 is configured to extract power from a generated electric field via resonant electric field coupling. While a magnetic field may also be present, little, if any, power is extracted via resonant or non-resonant magnetic field coupling. The multi-phase receive resonator 312 comprises n receive capacitive electrodes 410 and n receive inductors 412. Each receive inductor 412 is electrically connected to a receive capacitive electrode 410. Each receive inductor 412 is electrically connected between a pair of diodes 414 of the multi-phase rectifier 314. Specifically, the first receive capacitive electrode 410 is electrically connected to the first receive inductor 412. The first receive inductor 412 is electrically connected between the first pair of diodes 414 of the multi-phase rectifier 314. Similarly, the $i^{th}$ receive capacitive electrode 410 is electrically connected to the $i^{th}$ receive inductor 412. The $i^{th}$ receive inductor 412 is electrically connected between the $i^{th}$ pair of diodes 414 of the multi-phase rectifier 314. The $i^{th}$ receive capacitive electrode 410 and inductor 412 pair is configured to resonate at a resonant frequency of the multi-phase transmit resonator 310 at a phase of (i−1)*350/n degrees to extract power from an electric field via resonant electric field coupling. As previously stated, the multi-phase rectifier 314 is configured to convert the n sinusoidal RF power signals from the receive multi-phase resonator 312 to a DC power signal. The multi-phase rectifier 314 comprises n pairs of diodes 414. The pairs of diodes 414 are arranged in parallel. Each pair of diodes 414 receives a sinusoidal RF power signal. Each sinusoidal RF power signal is shifted 360/n degrees out of phase from the other sinusoidal RF power signals. The phases are distributed such that when the first signal is at 0 degrees, the second signal is at 360/n degrees, the third signal is at 2*360/n degrees and the $i^{th}$ signal is at (i−1)*360/n degrees. The n sinusoidal RF power signals are rectified into a DC power signal that is output to the load 316.

As shown in FIG. 4, the capacitance of the $i^{th}$ transmit capacitive electrode 406 to ground is represented by the capacitance $C_{GTi}$. The capacitance of the $i^{th}$ receive capacitive electrode 410 to ground is represented as $C_{GRi}$. The capacitance of the $i^{th}$ transmit capacitive electrode 406 and the adjacent transmit capacitive electrode 406 is represented as $C_{MTi(i+1)}$. The capacitance of the $i^{th}$ transmit capacitive electrode 406 and the $j^{th}$ transmit capacitive electrode 406 is represented as $C_{MTij}$ (not shown). The capacitance of the $i^{th}$ receive capacitive electrode 410 and the adjacent receive capacitive electrode 410 is represented as $C_{MRi(i+1)}$. The capacitance of the $i^{th}$ receive capacitive electrode 410 and the $j^{th}$ receive capacitive electrode 410 is represented as $C_{MRij}$ (not shown). The capacitance of the $i^{th}$ transmit capacitance electrode 406 and the adjacent $i^{th}$ receive capacitive electrode 410 is represented as $C_{MTRii}$. Similarly, the capacitance of the $i^{th}$ receive capacitive electrode 410 and the adjacent $i^{th}$ transmit capacitance electrode 406 is represented as $C_{MTRii}$. The capacitance of the $i^{th}$ transmit capacitance electrode 406 and the $j^{th}$ receive capacitive electrode 410 is represented as $C_{MTRij}$ (not shown). Similarly, the capacitance of the the $j^{th}$ receive capacitive electrode 410 and the $i^{th}$ transmit capacitance electrode 406 is represented as $C_{MTRji}$ (not shown). The inductance of the transmit inductor 404 is represented as $L_{Ti}$. The inductance of the receive inductor 412 is represented as $L_{Ri}$. The term i is an integer between, and including, 1 and n, where i+1 is at most equal to n. When i is equal to n, then i+1 is understood to be 1, as the labelling is periodic. The term j is an integer between, and including, 1 and n.

As described above, the multi-phase receive resonator 312 has n pairs of receive capacitive electrodes 410 and inductors 412. Each pair of receive capacitive electrodes 410 and inductors 412 carries one of the n sinusoidal RF power signals to the multi-phase rectifier 314 and then to the load 316. The wireless power transfer system 300 is balanced when all n pairs of receive capacitive electrodes 410 and inductors 412 carry currents that are of the same amplitude and frequency, but differ in phase by 360/n degrees between successive branches, such that the sum of the currents on all pairs of receive capacitive electrodes 410 and inductors 412 is zero. If the sum of the currents on all pairs of receive capacitive electrodes 410 and inductors 412 is non-zero, an additional return path to ground must exist. As there are no additional physical connections between the multi-phase transmit and receive resonators 310 and 312, respectively, beyond the capacitances $C_{MTRji}$, this non-zero sum current manifests as a current returning through the environment. The performance of the system 400 is dependent on the impedance of the return path. In this embodiment, performance includes one or more of efficiency, power delivery, electromagnetic interference (EMI) and heating. The impedance of the return path depends on the geometry and electrical properties of any objects in the surrounding environment of the system. Furthermore, an unbalanced system may exhibit common-mode or ground return current. Therefore, an unbalanced system will be less robust as an unbalanced system will be more affected by the impedance of any objects in the surrounding environment of the system than a balanced system.

The wireless power transfer system 300 has an impedance presented at an input and an output thereof. When transferring power from the power source 306 to the load 316, the impedance presented at the input and output of the wireless power transfer system 300 must be balanced such that all sinusoidal RF power signals output from the multi-phase RF converter 308 encounter substantially the same impedance while entering the multi-phase transmit resonator 310 and while exiting the multi-phase receive resonator 312. If the wireless power transfer system 300 is unbalanced, energy will be lost during the wireless power transfer as energy output from the power source 306 is emitted as heat or sunk into ground. A balanced wireless power transfer system 300 eliminates common mode noise within the wireless power transfer system 300. Provided with a balanced multi-phase RF converter 308 and a balanced load 316 of the wireless power transfer system 400, the wireless power transfer system 400 will be balanced when certain requirements are met. Specifically, the following conditions must be met in order for the wireless power transfer system 400 to be balanced:

$$L_{T1}=L_{T2}= \ldots =L_{Tn}$$

$$C_{GT1}=C_{GT2}= \ldots =C_{GTn}$$

$$C_{MT12}=C_{MT23}= \ldots =C_{MT(n-1)n}=C_{MTn1}$$

$$C_{MT1(1+i)}=C_{MT2(2+i)}= \ldots =C_{MTni}$$

$$L_{R1}=L_{R2}= \ldots =L_{Rn}$$

$$C_{GR1}=C_{GR2}= \ldots =C_{GRn}$$

$$C_{MR12}=C_{MR23}= \ldots =C_{MR(n-1)n}=C_{MRn1}$$

$$C_{MR1(1+i)}=C_{MR2(2+i)}= \ldots =C_{MRni}$$

$$C_{MTR11}=C_{MTR22}= \ldots =C_{MTRnn}$$

$$C_{MTR1(1+i)}=C_{MTR2(2+i)}= \ldots =C_{MTRni}$$

$$C_{MTR(1+i)1}=C_{MTR(2+i)2}= \ldots =C_{MTRin}$$

These conditions are met if the capacitive electrodes 404 and 416 have identical dimensions and configurations, and the inductors 404 and 412 have identical dimensions and configurations.

During operation, the power source 306 outputs a DC power signal to the multi-phase RF converter 308. The multi-phase RF converter 308 converts the DC power signal into n sinusoidal RF power signals. The controller sends gate signals to the switches 402 such that each pair of switches 402 of the multi-phase RF converter 308 outputs one of the sinusoidal RF power signals to an transmit inductor 404 and capacitive electrode 406 pair of the multi-phase transmit resonator 310. Each transmit inductor 404 and capacitive electrode 406 pair resonate at a resonant frequency of the multi-phase transmit resonator 301 to generate an electric field. Specifically, the $i^{th}$ pair of transmit inductor 404 and capacitive electrode 406 resonate at the resonant frequency at a phase of (i−1)*360/n degrees to generate an electric field. When the multi-phase receive resonator 312 is within the electric field generated by the multi-phase transmit resonator 310, the electric field excites the multi-phase receive resonator 312 through resonant electric field coupling. Power is then wirelessly extracted by the multi-phase receive resonator 314 from the multi-phase transmit resonator 310. The multi-phase receive resonator 312 outputs the received sinusoidal RF power signals to the multi-phase rectifier 314. The multi-phase rectifier 314 rectifies the sinusoidal RF power signals to a DC power signal. The DC power signal is then applied to the load 316.

The higher number of phases in the wireless power transfer system 300, compared to the wireless power transfer system 200, increases the maximum output power of the multi-phase RF converter 308 (for a given switch 402 and voltage input into the multi-phase RF converter 308), as each phase requires a dedicated pair of switches 402 to handle a limited amount of current and voltage. The maximum output power of the multi-phase RF converter 308 scales linearly with the number of phases. For a transmit multi-phase resonator 310 with a fixed area for the transmit capacitive electrodes 406, increasing the number of transmit capacitive electrodes 406 reduces the area of each transmit capacitive electrode 406. Since the input capacitance of each transmit capacitive electrode 406 is dependent on the area of the respective transmit capacitive electrode 406, increasing the number of transmit capacitive electrodes 406 decreases the input capacitance of each transmit capacitive electrode 406. The input capacitance is defined as the capacitance seen looking into the respective transmit capacitive electrode 406 or the capacitance that must be compensated by the transmit inductor 404 to achieve resonance at the resonant frequency; therefore, additional phases require additional inductance per transmit capacitive electrode 406. For each additional phase, the multi-phase RF converter 308 requires at least one additional metal-oxide semiconductor field-effect transistor (MOSFET) or wide bandgap device (WBD) switch 402, each multi-phase transmit resonator 310 requires at least one additional transmit inductor 404, and the multi-phase rectifier 314 requires at least one additional diode 414.

The wireless power transfer system 300 may be used for, but not limited to, transfer power in systems with lateral or rotational motion. The wireless power transfer system 300 may also be used to transfer power for a variety of rotational systems, such as through a rotating joint. A rotating joint is defined as a device comprising two or more joined parts, wherein at least one part rotates. The wireless power transfer system 300 maintains efficient power transfer throughout 360 degrees of rotation.

Figure 5A:
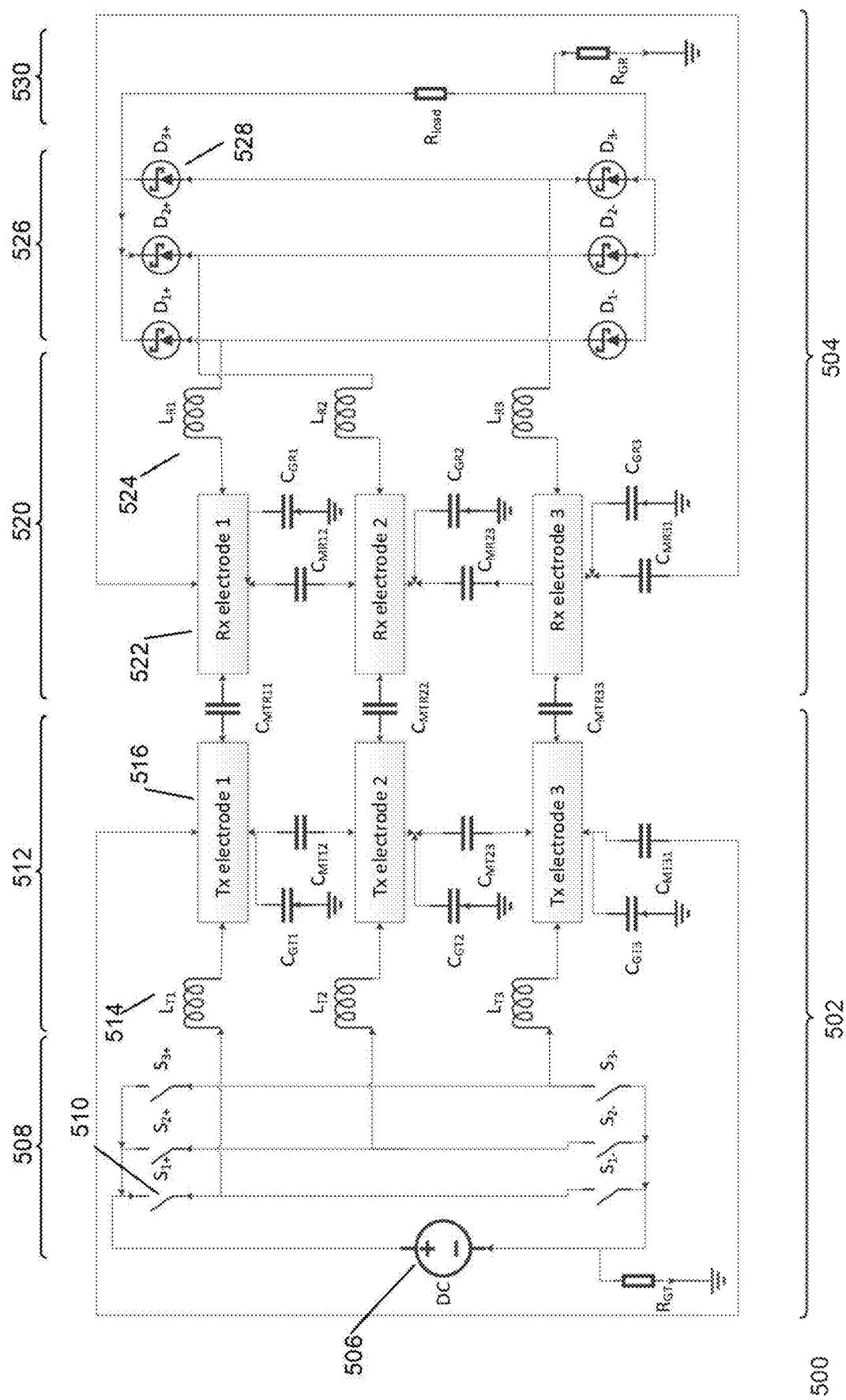
FIG. 5A is a schematic layout of a wireless power transfer system in accordance with an aspect of the disclosure.

While a wireless power transfer system 300 has generally been described, one of skill in the art will appreciate that particular embodiments are possible. FIG. 5A shows a circuit diagram of a wireless power transfer system generally identified by reference numeral 500. The wireless power transfer system 500 is an embodiment of the wireless power system 300 in which the integer n is equal to 3. The wireless power transfer system 300 comprises a transmitter 502 and a receiver 504. The transmitter 502 is configured to transfer power to the receiver 504 via resonant electric field coupling as previously described. The receiver 504 is configured to extract power from the transmitter 502 via resonant electric field coupling as previously described.

The transmitter 502 comprises a power source 506, a multi-phase RF converter 508 and a multi-phase transmit resonator 512. The power source 506 is electrically connected to the multi-phase RF converter 508. The power source 506 is configured to generate a DC power signal. The power source 506 is configured to output the DC power signal to the multi-phase RF converter 508. The multi-phase RF converter 508 is electrically connected to the power source 506. The multi-phase RF converter 508 is electrically connected to the multi-phase transmit resonator 512. The multi-phase RF converter 508 is configured to convert the DC power signal into three (3) sinusoidal RF power signals. The sinusoidal RF power signals are shifted out of phase with each other. Each sinusoidal RF power signal is shifted 360/3 degrees out of phase from successive sinusoidal RF power signals. The phases are distributed such that when the first signal is at 0 degrees, the second signal is at 120 degrees and the third signal is at 240 degrees. The three sinusoidal RF power signals are output from the multi-phase RF converter 508 to the multi-phase transmit resonator 512.

In this embodiment, the multi-phase RF converter 508 is a three-phase RF inverter. The multi-phase RF converter 508 comprises three pairs of switches 510 and a controller (not shown). The pairs of switches 510 are arranged in parallel. Each pair of switches 510 outputs a sinusoidal RF power signal. Each sinusoidal RF power signal is shifted 120 degrees out of phase. The three sinusoidal RF power signals are output from the multi-phase RF converter 508 to the multi-phase transmit resonator 512.

In this embodiment, the switches 510 are MOSFETs. In another embodiment, the switches 510 are WBDs. In one embodiment, the WBDs are eGaN field-effect transistors (FETs). The controller is configured to send gate signals to the switches 510 to control switching of the switches 510. In this embodiment, the controller is a DSP. The DSP is configured to send gate signals to the switches 402. The gate signals are phase shifted such that the multi-phase RF converter 308 performs as a multi-phase voltage source with corresponding output voltage. For example, in a three-phase system, the gate signals would be in 120 degrees phase shifts (360 degrees/3) such that the output voltage of the three-phase converter performs as a 3-phase voltage source.

In this embodiment, the multi-phase transmit resonator 512 is a three-phase transmit resonator. The multi-phase transmit resonator 512 is configured to generate an electric field and to transfer power via resonant electric field coupling. While a magnetic field may also be generated, little, if any, power is transferred via resonant or non-resonant magnetic field coupling. The multi-phase transmit resonator 512 comprises three transmit inductors 514 and three transmit capacitive electrodes 516. Each transmit inductor 514 is electrically connected to a transmit capacitive electrode 516. Each transmit inductor 514 is electrically connected between a pair of switches 510 of the multi-phase RF converter 508. In this embodiment, each transmit inductor 514 is directly electrically connected to a respective transmit capacitive electrode 516. The first transmit inductor 514 is electrically connected between the first pair of switches 510 of the multi-phase RF converter 508. The first electrically connected pair of transmit inductor 514 and capacitive electrode 516 is configured to resonate at a resonant frequency of the multi-phase transmit resonator 512 at a phase of 0 degrees to generate an electric field. The second electrically connected pair of transmit inductor 514 and capacitive electrode 516 is configured to resonate at a resonant frequency of the multi-phase transmit resonator 512 at a phase of 120 degrees to generate an electric field. The third electrically connected pair of transmit inductor 514 and capacitive electrode 516 is configured to resonate at a resonant frequency of the multi-phase transmit resonator 512 at a phase of 240 degrees to generate an electric field.

The receiver 504 comprises a multi-phase receive resonator 520, a multi-phase rectifier 526 and a load 530. The multi-phase receive resonator 520 is configured to extract power from the multi-phase transmit resonator 512 via resonant electric field coupling. While a magnetic field may also be present, little, if any, power is extracted via resonant or non-resonant magnetic field coupling. The multi-phase receive resonator 520 is electrically connected to the multi-phase rectifier 526.

In this embodiment, the multi-phase receive resonator 520 is a three-phase receive resonator. The multi-phase receive resonator 520 is configured to output three sinusoidal RF power signals to the multi-phase rectifier 526. The sinusoidal RF power signals are shifted out of phase with each other. Each sinusoidal RF power signal is shifted 120 degrees out of phase. The phases are distributed such that when the first signal is at 0 degrees, the second signal is at 120 degrees and the third signal is at 240 degrees. The multi-phase receive resonator 520 comprises three receive capacitive electrodes 522 and three receive inductors 524. Each receive inductor 524 is electrically connected to a receive capacitive electrode 522. In this embodiment, each receive inductor 524 is directly electrically connected to a respective receive capacitive electrode 522. Each receive inductor 524 is electrically connected between a pair of diodes 528 of the multi-phase rectifier 526. The first receive capacitive electrode 522 and inductor 524 pair is configured to resonate at a resonant frequency of the multi-phase transmit resonator 512 at a phase of 0 degrees to extract power from an electric field via resonant electric field coupling. The second receive capacitive electrode 522 and inductor 524 pair is configured to resonate at a resonant frequency of the multi-phase transmit resonator 512 at a phase of 120 degrees to extract power from an electric field via resonant electric field coupling. The third receive capacitive electrode 522 and inductor 524 pair is configured to resonate at a resonant frequency of the multi-phase transmit resonator 512 at a phase of 240 degrees to extract power from an electric field via resonant electric field coupling.

In this embodiment, the multi-phase rectifier 526 is a three-phase rectifier. The multi-phase rectifier 526 is configured to convert the received three sinusoidal RF power signals into a DC power signal. The multi-phase rectifier 526 is electrically connected to the load 530. The multi-phase rectifier 526 outputs the DC power signal to the load 530. The multi-phase rectifier 526 comprises three pairs of diodes 528. The pairs of diodes 528 are arranged in parallel. Each pair of diodes 528 receives a sinusoidal RF power signal. Each sinusoidal RF power signal is shifted 120 degrees out of phase. The three sinusoidal RF power signals are rectified into a DC power signal that is output to the load 530.

The load 530 is electrically connected to the multi-phase rectifier 526. The load 530 receives the DC power signal from the multi-phase rectifier 526.

As shown in FIG. 5, the capacitance of the $i^{th}$ transmit capacitive electrode 516 to ground is represented by the capacitance $C_{GTi}$. The capacitance of the $i^{th}$ receive capacitive electrode 522 to ground is represented as $C_{GRi}$. The capacitance of the $i^{th}$ transmit capacitive electrode 516 and the adjacent transmit capacitive electrode 516 is represented as $C_{MTi(i+1)}$. The capacitance of the $i^{th}$ transmit capacitive electrode 516 and the $j^{th}$ transmit capacitive electrode 516 is represented as $C_{MTij}$ (not shown). The capacitance of the $i^{th}$ receive capacitive electrode 522 and the adjacent receive capacitive electrode 522 is represented as $C_{MRi(i+1)}$. The capacitance of the $i^{th}$ receive capacitive electrode 522 and the $j^{th}$ receive capacitive electrode 522 is represented as $C_{MRij}$ (not shown). The capacitance of the $i^{th}$ transmit capacitance electrode 516 and the adjacent $i^{th}$ receive capacitive electrode 522 is represented as $C_{MTRii}$. Similarly, the capacitance of the $i^{th}$ receive capacitive electrode 522 and the adjacent $i^{th}$ transmit capacitive electrode 516 is represented as $C_{MTRii}$. The capacitance of the $i^{th}$ transmit capacitance electrode 516 and the adjacent $j^{th}$ receive capacitive electrode 522 is represented as $C_{MTRij}$ (not shown). Similarly, the capacitance of the $j^{th}$ receive capacitive electrode 522 and the $i^{th}$ transmit capacitance electrode 516 is represented as $C_{MTRji}$ (not shown). The inductance of the transmit inductor 510 is represented as $L_{Ti}$. The inductance of the receive inductor 524 is represented as $L_{Ri}$. The term i is an integer between, and including, 1 and 3, where i+1 is at most equal to 3. The term j is an integer between, and including, 1 and 3.

As previously discussed with reference to the wireless power transfer system 400 with a balanced multi-phase RF converter 508 and a balanced load 530 of the wireless power transfer system 500, the wireless power transfer system 500 will be balanced when certain requirements are met. Specifically, the following conditions must be met in order for the wireless power transfer system 500 to be balanced:

$$L_{T1}=L_{T2}=L_{T3}$$

$$C_{GT1}=C_{GT2}=C_{GT3}$$

$$C_{MT12}=C_{MT23}=C_{MT31}$$

$$L_{R1}=L_{R2}=L_{R3}$$

$$C_{GR1}=C_{GR2}=C_{GR3}$$

$$C_{MR12}=C_{MR23}=C_{MR31}$$

$$C_{MTR11}=C_{MTR22}=C_{MTR33}$$

$$C_{MTR12}=C_{MTR21}=C_{MTR23}=C_{MTR32}=C_{MTR31}=C_{MTR13}$$

These conditions are met if the capacitive electrodes 516 and 522 have identical dimensions and configurations, and the inductors 510 and 524 have identical dimensions and configurations.

Figure 5B:
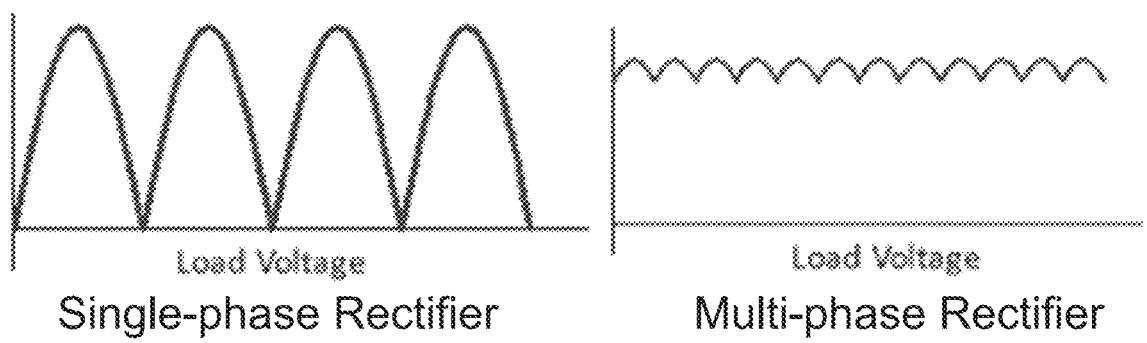
FIG. 5B is a graph of the load voltage output by the multi-phase rectifier of the wireless power transfer system of FIG. 5A.

A simulation was performed to determine the performance of the multi-phase rectifier 526 compared to a conventional single-phase rectifier. FIG. 5B is a graph of the load voltage output by the multi-phase rectifier 526 of the wireless power transfer system 500 compared to load voltage output by a single-phase rectifier. As shown in FIG. 5B, the load voltage output by the multi-phase rectifier 526 exhibits less ripple than the load voltage output by the single-phase rectifier.

Figure 6:
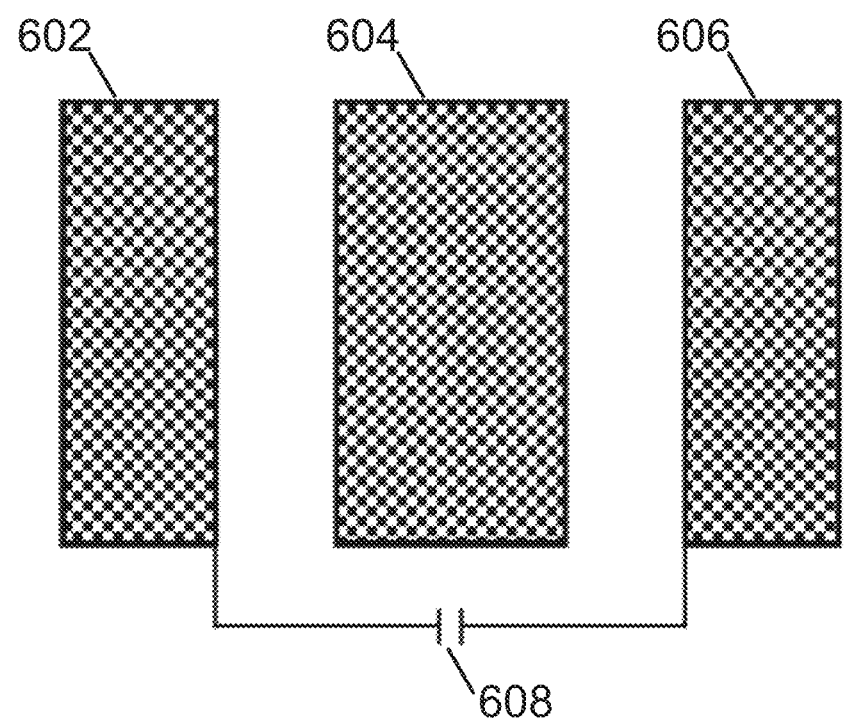
FIG. 6 is a plan view of the transmit capacitive electrodes of the wireless power transfer system of FIG. 5A.

As shown in FIG. 6, in this embodiment of the wireless power transfer system 500, the transmit capacitive electrodes 516 of the multi-phase transmit resonator 512 comprise three generally elongate planar plates. The plates are coplanar. The plates are generally rectangular. The plates are laterally spaced. The plates comprise a first plate 602, a second plate 604 and a third plate 606. The first plate 602 is spaced apart from the second plate 604 and generally parallel with the second plate 604. The second plate 604 is spaced apart from the first plate 602 and the third plate 606, and generally parallel with the first plate 602 and the third plate 606. The third plate 606 is spaced apparat from the second plate 604 and generally parallel with the second plate 604. The first and third plates 602 and 606, respectively, are identical in shape and size. The first, second and third plates 602, 604 and 606, respectively, have the same length.

In this embodiment, the first plate 602 and the third plate 606 are electrically connected via a lumped capacitor 608. The lumped capacitor 608 compensates for weak capacitance between the first plate 602 and the third plate 606.

As previously stated, the mutual capacitance between adjacent plates is represented as capacitance Cmt and the capacitance to ground of each plate is represented as capacitance Cg. The second plate 604 has a greater width than the widths of the first and third plates 602 and 606, respectively. The second plate 604 has the greater width in order for the second plate 604 to maintain the same capacitance to ground Cg as the first and third plates 602 and 606, respectively. While the transmit capacitance electrodes 516 have been described, one of skill in the art will appreciate that the receive capacitive electrodes 522 may be similarly configured.

Figure 7:
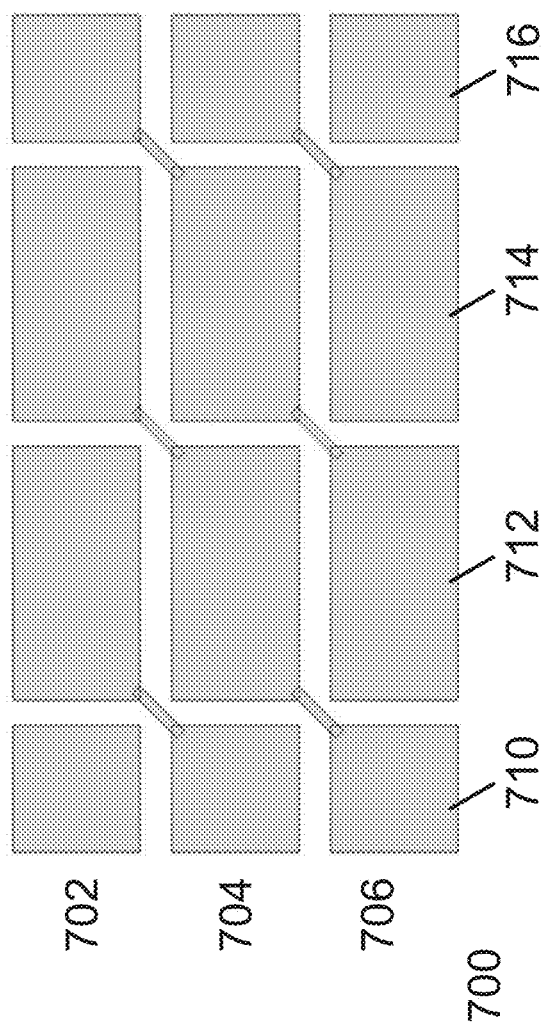
FIG. 7 is a plan view of another embodiment of the transmit capacitive electrodes of the wireless power transfer system of FIG. 5A.
Figure 8:
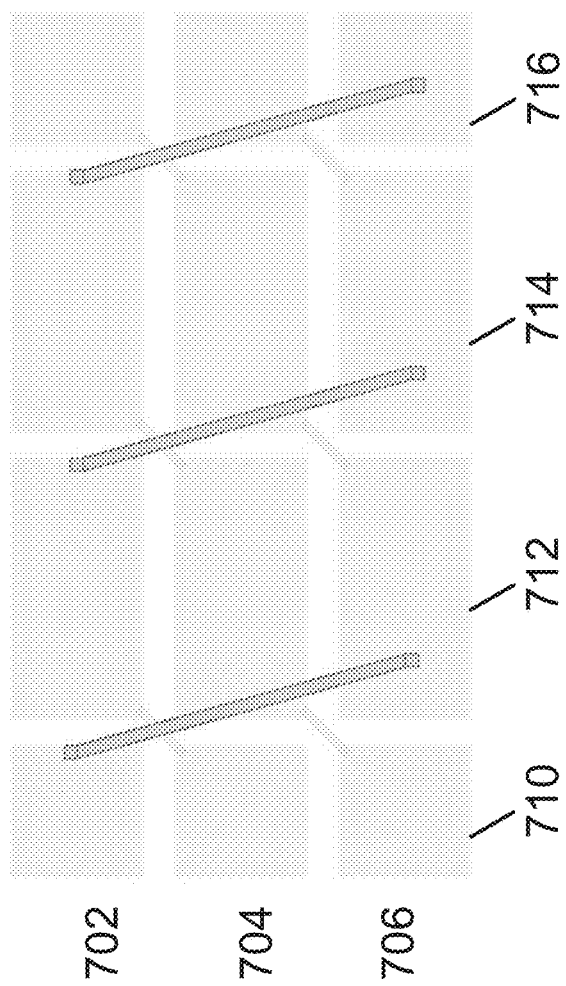
FIG. 8 is another plan view of the transmit capacitive electrodes of FIG. 7.

While the transmit capacitive electrodes 516 have been described as having a particular configuration, one of skill in the art will appreciate that other configurations are possible. FIGS. 7 and 8 show another embodiment of the transmit capacitive electrodes 516 generally identified as reference numeral 700. In this embodiment, the transmit capacitive electrodes 700 comprise n (three) rows of electrodes 702, 704 and 706, one for each phase of the multi-phase transmit resonator 512. Each row of electrodes 702, 704 and 706 comprises 3*m+1 (four) plates, where m is a positive integer. In this embodiment m is 1. The plates are generally elongate planar plates. In this embodiment, the plates are coplanar. The plates are laterally spaced. The plates in each row of electrodes 702, 704 and 706 comprise a first plate 710, a second plate 712, a third plate 714 and a fourth plate 716. The first plate 710 and fourth plate 716 are identical. The first plate 710 and the fourth plate 716 are generally rectangular. The second plate 712 and third plate 714 are identical. The second plate 712 and the third plate 714 are generally rectangular. The second plate 712 and the third plate 714 have twice the length of the first and fourth plates 710 and 716.

The first plate 710 is spaced apart from the second plate 712 and generally parallel with the second plate 712. The second plate 712 is spaced apart from the first plate 710 and the third plate 714, and generally parallel with the first plate 710 and the third plate 714. The third plate 714 is spaced apart from the second plate 712 and the fourth plate 716, and generally parallel with the second plate 712 and the fourth plate 716. The fourth plate 716 is spaced apart from the third plate 714 and generally parallel with the third plate 714. The first, second, third and fourth plates 710, 712, 714 and 716, respectively, have the same height. The second plate 712 and the third plate 714 have double the length of the first plate 710 and the fourth plate 716.

As shown in FIGS. 7 and 8, the first, second and third plates 710, 712 and 714, respectively, in the first row of electrodes 702 are electrically connected via out-of-plane traces to the second, third and fourth plates 712, 714 and 716, respectively, of the third row of electrodes 702. The second, third and fourth plates 712, 714 and 716, respectively, of the first row of electrodes 702 are electrically connected via in-plane traces to the first, second and third plates 710, 712 and 714, respectively, of the second row of electrodes 704. The second, third and fourth plates 712, 714 and 716, respectively, of the second row of electrodes 704 are electrically connected via in-plane traces to the first, second and third plates 710, 712 and 714, respectively, of the third row of electrodes 706.

The configuration of transmit capacitive electrodes 700 shown in FIGS. 7 and 8 ensures that the multi-phase transmit resonator 512 is approximately balanced.

While transmit capacitance electrodes 700 have been described, one of skill in the art will appreciate that the receive capacitive electrodes 522 may be similarly configured.

Figure 9:
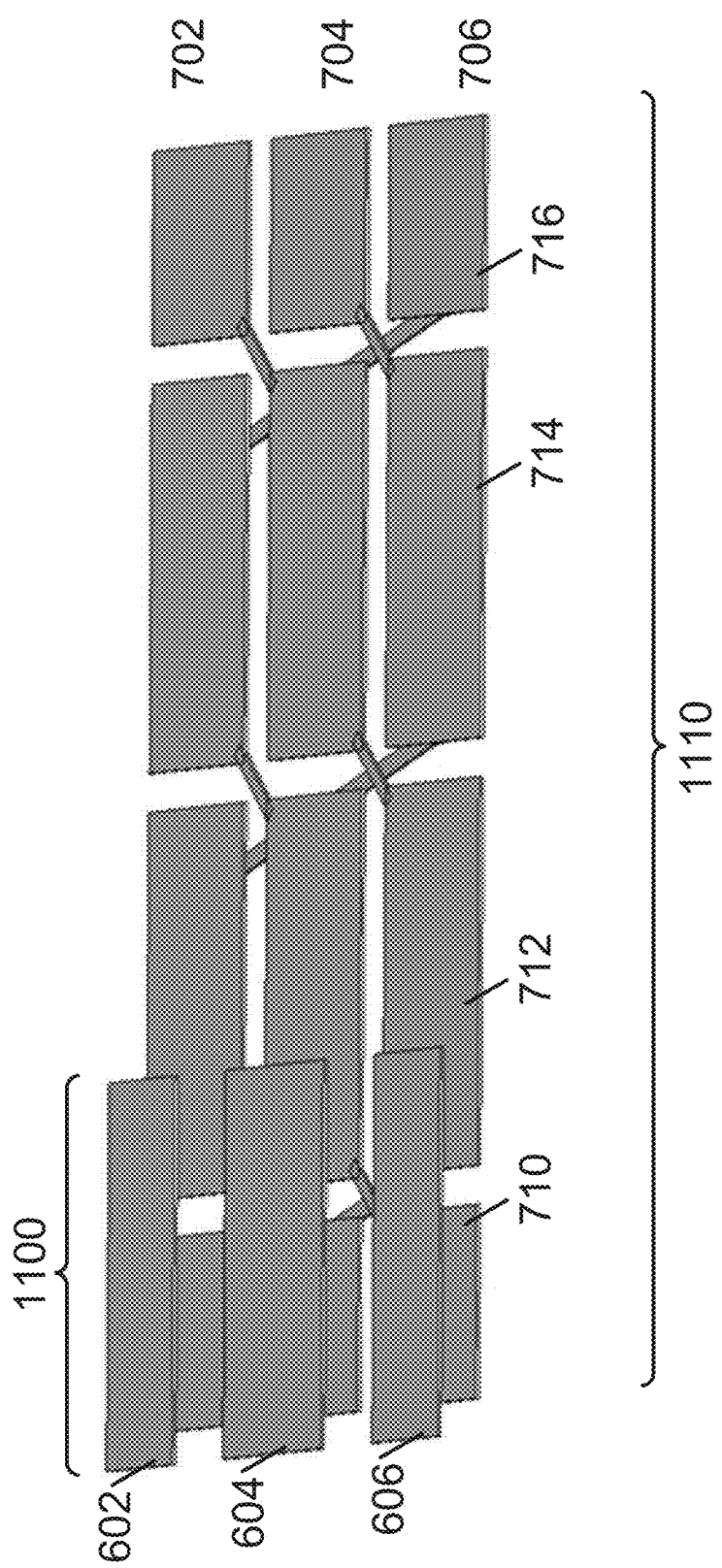
FIG. 9 is a plan view of another embodiment of the transmit capacitive electrodes and receive capacitive electrodes of the wireless power transfer system of FIG. 5A.

While the embodiments of the transmit capacitive electrodes 516 described and shown in FIGS. 6 to 8 have been described separately, one of skill in the art will appreciate that they may be combined. Turning now to FIG. 9, a plan view of another embodiment of the receive capacitive electrodes 522 is shown generally identified by reference numeral 1100. The receive capacitive electrodes 1100 comprise the first plate 602, second plate 604 and third plate 606. In this embodiment, the transmit capacitive electrodes 516 are generally identified by reference numeral 1110. The transmit capacitive electrodes 1110 comprise the rows of electrodes 702, 704 and 706 having the first plate 710, second plate 712, third plate 714 and fourth plate 716.

Figure 10:
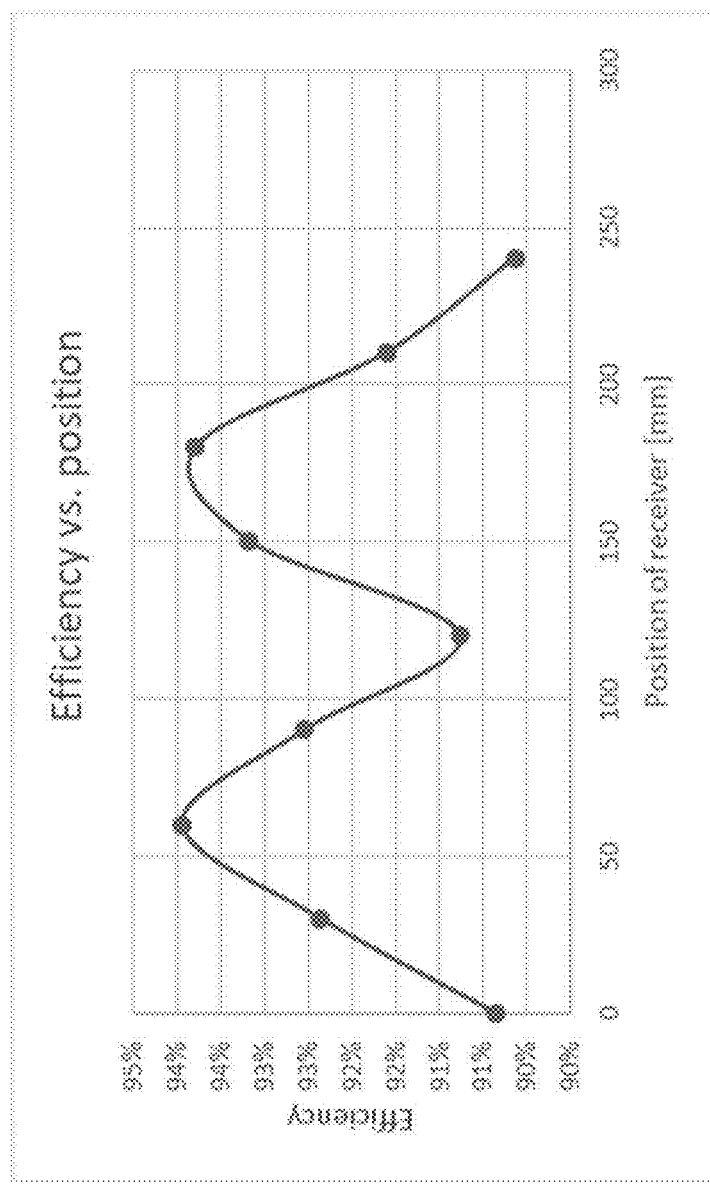
FIG. 10 is a graph of the radio frequency (RF) efficiency of the wireless power transfer system of FIG. 5A with the transmit capacitive electrodes and receive capacitive electrodes of FIG. 9.

A simulation was performed to determine the performance of the wireless power transfer system 300 with the receive capacitive electrodes 1100 comprising the first plate 602, second plate 604 and third plate 606, and the transmit capacitive electrodes 1110 comprising the rows of electrodes 702, 704 and 706 having the first plate 710, second plate 712, third plate 714 and fourth plate 716. In the simulation, the receive capacitive electrodes 1100 were moved along the horizontal span of the transmit capacitive electrodes 1110 from a starting position of 0 mm to a final position of 300 mm. FIG. 10 is a graph of the RF efficiency at a resonant frequency of 13.56 MHz as a function of the movement of the receive capacitive electrodes 1100 along the horizontal span of the transmit capacitive electrodes 1110. The RF efficiency is defined as the efficiency of the wireless power transfer between the multi-phase transmit and receive resonators 512 and 520, respectively. As shown in FIG. 10, the RF efficiency is maintained at a level above 90%.

While exemplary transmit and receive capacitive electrodes have been described as being rectangular or square, one of skill in the art will appreciate that other configurations are possible. In another embodiment, the transmit capacitive electrodes 406 comprise n identical planar transmit segments. The transmit segments are equally spaced around a central point within a plane. The transmit segments are symmetric upon 360/n degree rotations about an axis perpendicular to the plane extending from the central point. The transmit segments are separated from each other. In this embodiment, the n transmit capacitive electrodes form a transmit capacitor. During use, the transmit capacitor resonates the reactance of the n transmit inductors 404 at the operating frequency of the RF converter 308. Each transmit inductor 404 resonates with the input capacitance of the corresponding transmit segment.

The receive capacitive electrodes 410 comprise n identical planar receive segments. The receive segments are equally spaced around a central point within a plane. The receive segments are symmetric upon 360/n degree rotations about an axis perpendicular to the plane extending from the central point. The receive segments are separated from each other. In this embodiment, the n receive capacitive electrodes form a receive capacitor.

During use, the multi-phase transmit resonator 310 is aligned with the multi-phase receive resonator 312 such that the major surfaces of the transmit segments and receive segments face each other, with the central point of each resonator 310 and 312 located directly transverse from each other. The receive segments may rotate at an angle θ about an axis perpendicular to the plane of the receive segments passing through the central point of the receive capacitor. When the transmit segments are rotationally aligned with the receive segments, each receive segment is closely coupled with a corresponding transmit segment. Therefore, each receive segment is driven at the phase of the corresponding transmit segment. At this position θ is set to 0. Due to the rotational symmetry of the transmit and receive segments, positions where θ=p*360/n (where p is any integer) will be indistinguishable from the position where θ=0 and therefore each other.

Figure 11:
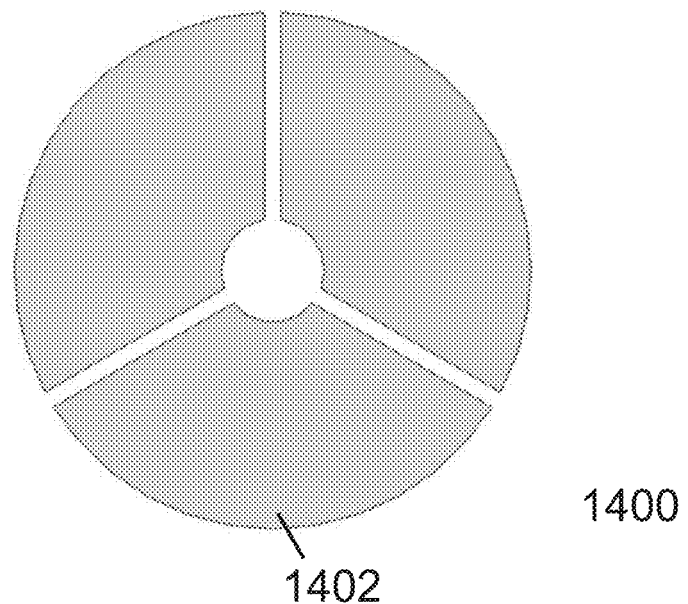
FIG. 11 is a plan view of another embodiment of the transmit capacitive electrodes of the wireless power transfer system of FIG. 5A.

While the transmit capacitive electrodes 516 have been described as having a particular configuration, one of skill in the art will appreciate that other configurations are possible. FIG. 11 shows another embodiment of the transmit capacitive electrodes 516 generally identified by reference numeral 1400. In this embodiment, the transmit capacitive electrodes 1400 comprise three segments 1402. In this embodiment, the segments 1402 are plates. The segments 1402 are coplanar. The segments 1402 are identically sized. The segments 1402 are spaced apart such that they generally form a circle about their circumferences. Each segment 1402 spans approximately 120 degrees of the circle. The segments 1402 are equally spaced around a central point within a plane. The segments 1402 have an axis of a three-fold rotational symmetry normal to the major face of the segments 1402 about the centre of curvature of the segments 1402. While the transmit capacitance electrodes 1400 have been described, one of skill in the art will appreciate that the receive capacitive electrodes 522 may be similarly configured.

Figure 12:
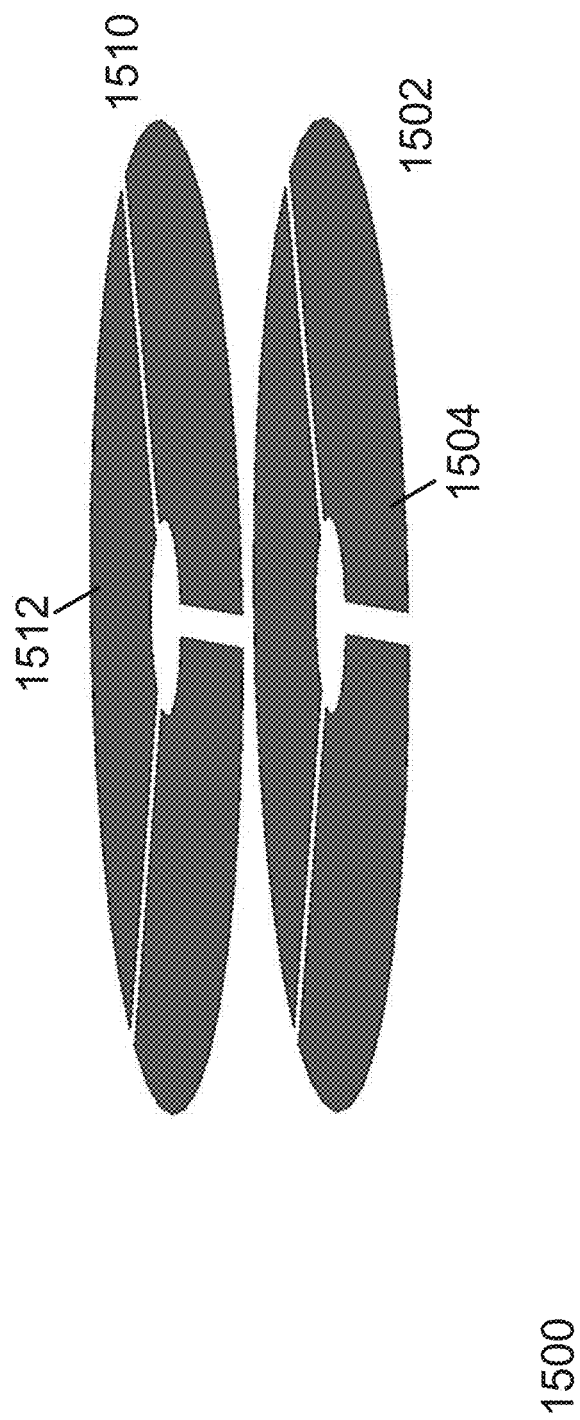
FIG. 12 is a perspective view of a wireless power transfer system in accordance with an aspect of the disclosure.

While the wireless power transfer system 500 has been described, one of skill in the art will appreciate that other configurations are possible. FIG. 12 shows a partial wireless power transfer system generally identified by reference numeral 1500. The wireless power transfer 1500 comprises a transmitter and a receiver. The transmitter is identical to the previously described transmitter 502 unless otherwise stated. The receiver is identical to the previously described receiver 504 unless otherwise stated.

In this embodiment, the multi-phase transmit resonator 512 comprises transmit capacitive electrodes 1502. The transmit capacitive electrodes 1502 comprise three transmit segments 1504. In this embodiment, the transmit segments 1504 are plates. The transmit segments 1504 are coplanar. The transmit segments 1504 are identically sized. The transmit segments 1504 are spaced apart such that they generally form a circle about their circumferences. Each transmit segment 1504 spans approximately 120 degrees of the circle. The transmit segments 1504 are equally spaced around a central point within a plane. The transmit segments 1504 have an axis of a three-fold rotational symmetry normal to the major face of the transmit segments 1504 about the centre of curvature of the transmit segments 1504. Each transmit segment 1504 is paired with an inductor 514 ensuring that the multi-phase transmit resonator 512 is configured to resonate at the resonant frequency of the multi-phase transmit resonator 512. The inductors 514 of the multi-phase transmit resonator 512 are identical. Given the symmetrical positioning of the transmit segments 1504, the multi-phase transmit resonator 512 is balanced.

In this embodiment, each transmit segment 1504 has an outer radius of 150 mm, an inner radius of 30 mm and a thickness of 0.1 mm. Each transmit segment 1504 is separated from the adjacent transmit segment 1504 by a 10 mm gap.

In this embodiment, the multi-phase receive resonator 520 comprises receive capacitive electrodes 1510. The receive capacitive electrodes 1510 comprise three receive segments 1512. In this embodiment, the receive segments 1512 are plates. The receive segments 1512 are coplanar. The receive segments 1512 are identically sized. The receive segments 1512 are spaced apart such that they generally form a circle about their circumferences. Each receive segment 1512 spans approximately 120 degrees of the circle. The receive segments 1512 are equally spaced around a central point within a plane. The receive segments 1512 have an axis of a three-fold rotational symmetry normal to the major face of the receive segments 1512 about the centre of curvature of the receive segments 1512. Each receive segment 1512 is paired with an inductor 524 ensuring the multi-phase receive resonator 520 is configured to resonate at the resonant frequency. Given the symmetrical positioning of the receive segments 512, the multi-phase receive resonator 520 is balanced. As both the multi-phase transmit and receive resonators 512 and 520 are balanced, the wireless power transfer system 1500 is balanced.

In this embodiment, each receive segment 1512 has an outer radius of 150 mm, an inner radius of 30 mm and a thickness of 0.1 mm. Each receive segment 1512 is separated from the adjacent receive segment 1512 by a 10 mm gap.

In this embodiment both the transmit and receive inductors 514 and 524, respectively, have an inductance of 9.98 pH and a quality factor (Q) of 225. The transmit capacitive electrodes 1502 and receive capacitive electrodes 1510 have identical geometry and are located 50 mm away each other. The transmit capacitive electrodes 1502 and receive capacitive electrodes 1510 have a common axis of three-fold rotational symmetry.

The wireless power transfer system 1500 may be implemented in rotating structures. Rotating structures may take the form of a slip ring, helicopter, swivelling chair, etc. When the wireless power transfer system 1500 is implemented in rotating structures, the transmit capacitive electrodes 1502 and the receive capacitive electrodes 1510 rotate through 360 degrees of rotation. Due to the three-fold rotational symmetry of the electrodes 1502 and 1510, establishing that the leakage current of the wireless power transfer system 1500 is negligible for all angular positions θ from 0 to 120 degrees demonstrates that the wireless power transfer system 1500 is balanced.

Figure 13:
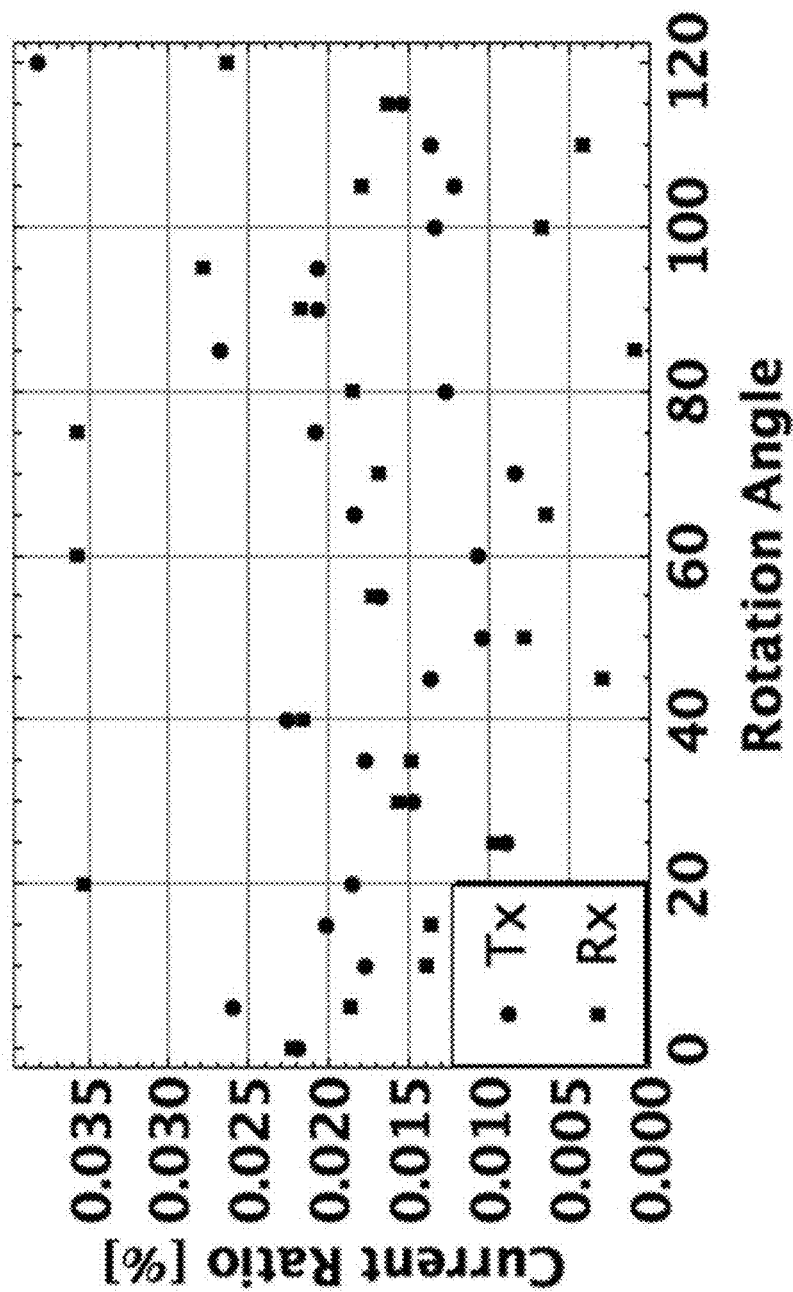
FIG. 13 is a graph of the ratio of the sum of currents to the magnitude of the currents as a percentage for a rotation from 0 to 120 degrees for the transmit and receive capacitive electrodes of the wireless power transfer system of FIG. 12.

Simulations were performed to determine the performance of the wireless power transfer system 1500 and establish that the leakage current of the wireless power transfer system 1500 is negligible for all angular positions θ from 0 to 120 degrees. FIG. 13 is a plot of the ratio of the sum of the current on each segment 1504 and 1512 to the sum of the magnitude of the current on each segment 1504 and 1512 as a percentage for a rotation from 0 to 120 degrees for both transmit and receive capacitive electrodes 1502 and 1510, respectively. The sum of the current on each segment 1504 and 1512 is defined as the common mode current. The ratio in FIG. 13 is given by:

$$\frac{i_1 + i_2 + i_3}{\sqrt{i_1 i_1^* + i_2 i_2^* + i_3 i_3^*}}$$

where $i_1$, $i_2$ and $i_3$ are the currents on the first, second, and third segments 1504 and 1512 of the respective transmit and receive capacitive electrodes 1502 and 1510, respectively.

Throughout 120 rotation, the sum of the currents on each segment 1504 and 1512 is less than 0.05% of the root mean square (RMS) of the currents. A sum of the currents of less than 0.05% of the RMS of the currents corresponds to a common mode rejection radio (CMRR) of 66 dB. Therefore, leakage currents are negligible, and the wireless power transfer system 1500 remains balanced under rotation.

Figure 14:
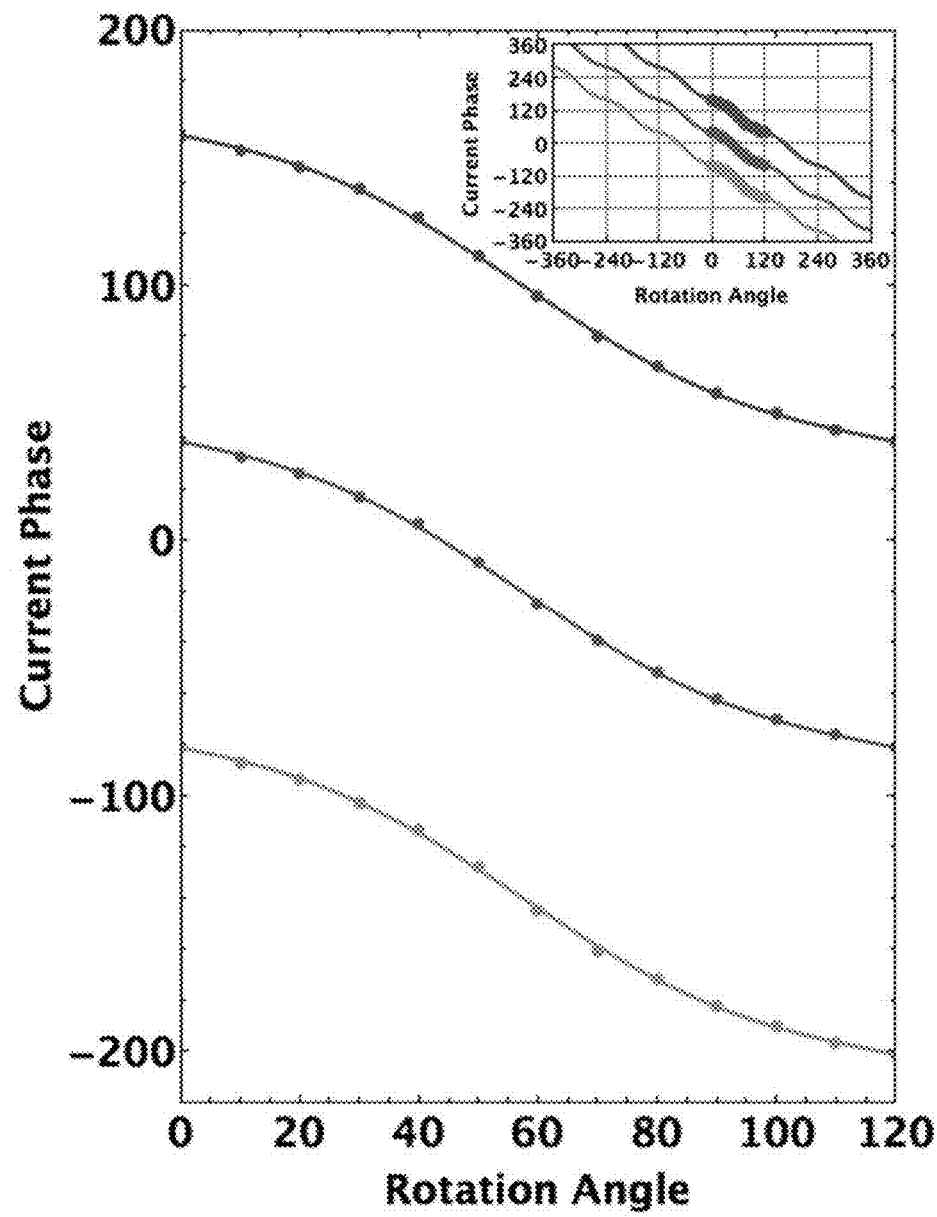
FIG. 14 is a graph of the phase of the current signal on each receive segment as a function of angular position of the wireless power transfer system of FIG. 12.

FIG. 14 is a graph of the phase of the current signal on each receive segment 1512 as a function of angular position θ (rotation angle). The phase of the current on each receive segment 1512 decreases almost linearly from 180 to −180 degrees (or equivalently 0 to 360 degrees) over a rotation of 360 degrees. The phase curves sinusoidally away from linearity with a periodicity of 120 degrees, reflecting the structure of the receive capacitive electrodes 510. A numerical model of each line in the graph of FIG. 14 is provided in Equations 1A, 1B and 1C below:

Phase 1=−θ+offset+$A$*sin(3*θ+ψ)+0    (Equation 1A)

Phase 2=−θ+offset+$A$*sin(3*θ+ψ)+120    (Equation 1B)

Phase 3=−θ+offset+$A$*sin(3*θ+ψ)+240    (Equation 1C)

where A is an amplitude of sinusoidal oscillation and ψ is a phase constant.

The modelling parameters for Equations 1A, 1B and 1C are provided in Table 1 below.

TABLE 1

| Parameter | Value | Standard Error |
|---|---|---|
| offset | 37.25 | 0.17 |
| A | 10.09 | 0.25 |
| Ψ | 9.01 | 1.35 |

As described by Equations 1A, 1B and 1C, the phase difference between two adjacent transmit or receive capacitive electrodes 1502 or 1510 is 120 degrees for any rotational angle, allowing continuous wireless power transfer while the multi-phase receive resonator 512 rotates relative to the multi-phase transmit resonator 520. The constant phase separation of 120° ensures the wireless power transfer system 1500 is balanced. Therefore, as established through simulation, the leakage current of the wireless power transfer system 1500 is negligible for all angular positions θ from 0 to 120 degrees.

Further simulations were performed to establish the RF efficiency and input impedance of the wireless power transfer system 1500 when implemented in rotating structures. Through these simulations, it was found that the RF efficiency stayed nearly constant during rotation of the transmit capacitive electrodes 1502 and receive capacitive electrodes 1504 of the wireless power transfer system 1500 and thus, provided predictable performance. However, the input impedance varies significantly during rotation of the transmit capacitive electrodes 1502 and receive capacitive electrodes 1504 of the wireless power transfer system 1500. Generally, during rotation of the transmit capacitive electrodes 1502 and receive capacitive electrodes 1504 of the wireless power transfer system 1500, the properties, including RF efficiency and input impedance, of the wireless power transfer system 1500 oscillate at n times the frequency of rotation about the mean value of the properties. The properties can be numerically approximated by the form provided in Equation 2 below:

$$g(\theta) = \bar{g} + Amp \cdot \sin(n \cdot \theta + \xi) \quad \text{(Equation 2)}$$

where g(θ) is the particular property as a function of rotation angle θ in degrees, g is the mean value of the property, Amp is the amplitude of oscillation defined as the difference between either extrema and the mean value $\bar{g}$, n is the number of phases, and ξ is a phase constant.

The RF efficiency, real part of the impedance, and imaginary part of the impedance of the wireless power transfer system 1500 are numerically described by using the modelling parameters in Table 2 below in Equation 2. The real and imaginary parts of the impedance of the wireless power transfer system 1500 are the components of the input impedance of the wireless power transfer system 1500.

TABLE 2

|  | $\bar{g}$ | AMP | ξ |
|---|---|---|---|
| RF Efficiency | 94.62 +/− 0.05% | 0.96 +/− 0.4% | 74 +/− 4 degrees |
| Real Part of the Impedance | 203 +/− 2 Ω | 90 +/− 1 Ω | 102 +/− 2 degrees |
| Imaginary Part of the Impedance | 30 +/− 0.8 Ω | 30 +/− 0.7 Ω | 131 +/− 2 degrees |

Figure 15:
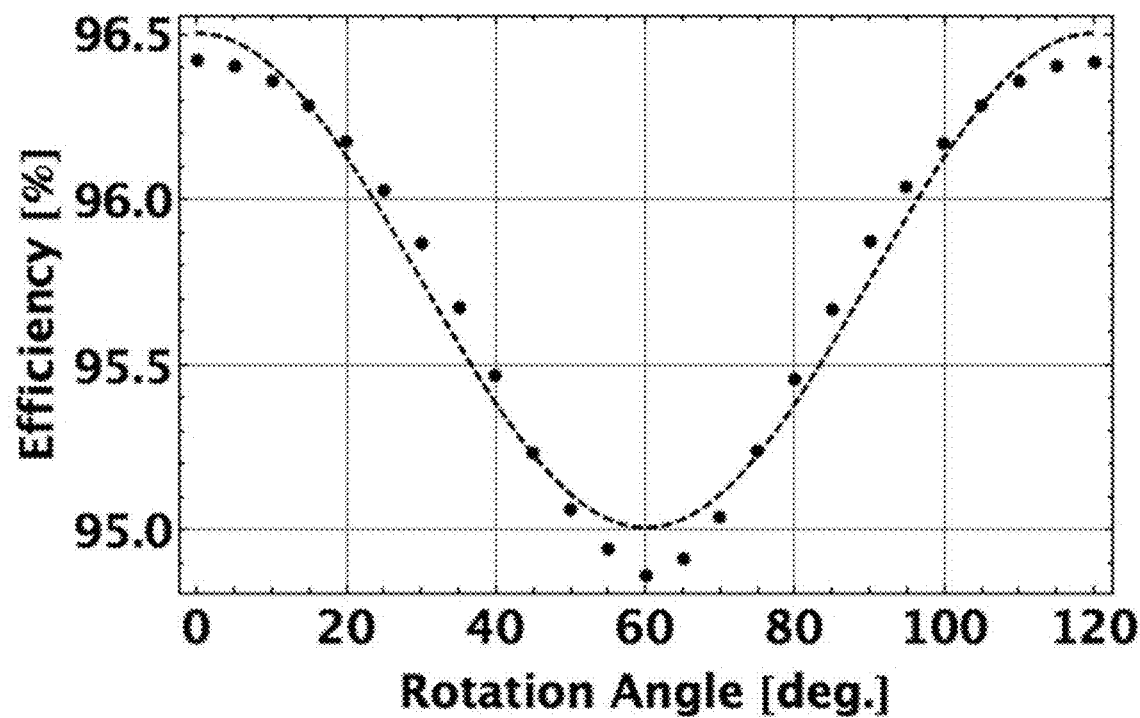
FIG. 15 is a graph of the radio frequency (RF) efficiency of the wireless power transfer system of FIG. 12 as a function of angular rotation.

FIG. 15 is a graph of the RF efficiency of the wireless power transfer system 1500 at a resonant frequency of 13.56 MHz as a function of angular rotation over 120 degrees. The RF efficiency is defined as the efficiency of the wireless power transfer between the multi-phase transmit and receive resonators 512 and 520, respectively. The RF efficiency shown in FIG. 15 is characterized by Equation 2 with the modeling parameters of Table 2. The offset parameter is large in comparison to the amplitude; therefore, the wireless power transfer system 1500 maintains an RF efficiency over 94.5% over 120 degrees of rotation.

Figure 16:
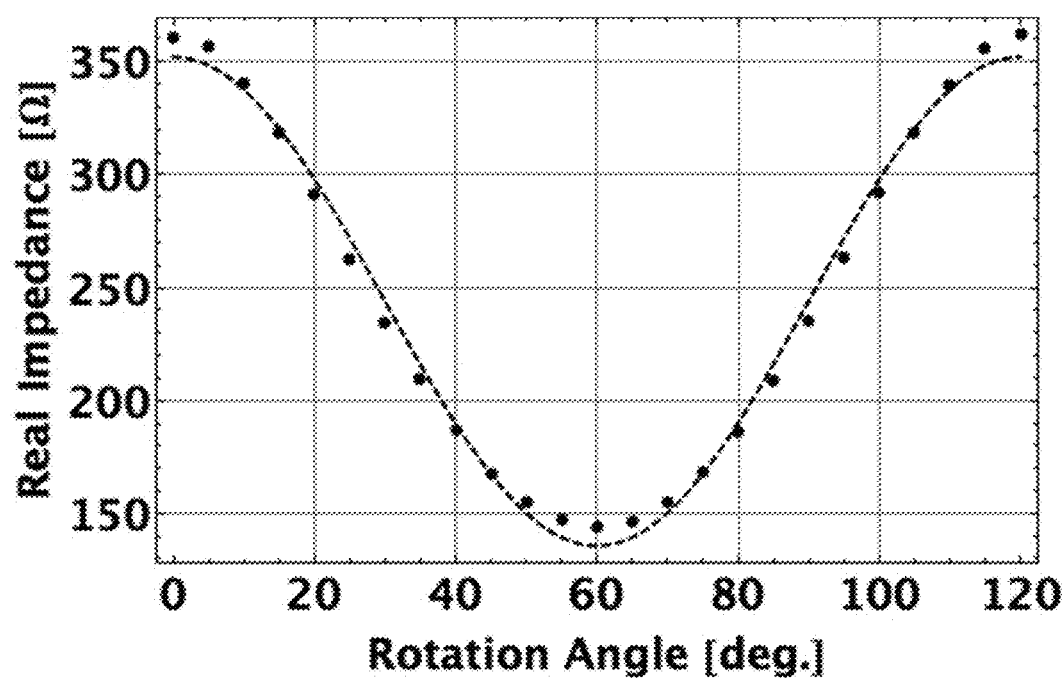
FIG. 16 is a graph of the real part of the impedance presented at each transmit capacitive electrode of the wireless power transfer system of FIG. 12 as a function of angular rotation.

FIG. 16 is a graph of the real part of the impedance presented at each transmit capacitive electrode 1502 of the wireless power transfer system 1500 as a function of angular rotation over 120 degrees. The input impedance is composed of the real and imaginary parts of the impedance presented at each transmit capacitive electrode 1502. The amplitude of the impedance variation is 44% of the offset. The real part of the impedance shown in FIG. 16 is characterized by Equation 2 with the modelling parameters of Table 2 above.

Figure 17:
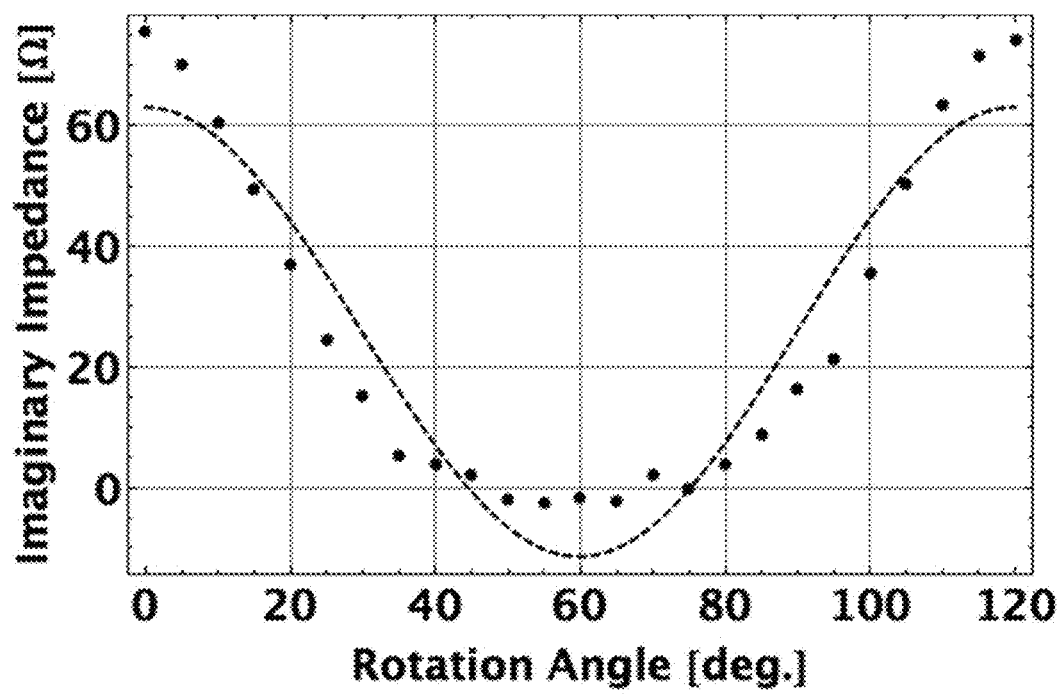
FIG. 17 is a graph of the imaginary part of the impedance presented at each transmit capacitive electrode of the wireless power transfer system of FIG. 12 as a function of angular rotation.

FIG. 17 is a graph of the imaginary part of the impedance presented at each transmit capacitive electrode 1502 of the wireless power transfer system 1500 as a function of angular rotation over 120 degrees. The imaginary part of the impedance shown in FIG. 17 is characterized by Equation 2 with the modelling parameters of Table 2 above.

The varied input impedance is loaded into the RF converter 508. For a constant load the RF converter 508 will therefore output a varied amount of power, resulting in varied amount of power received at the receiver 504.

Figure 18:
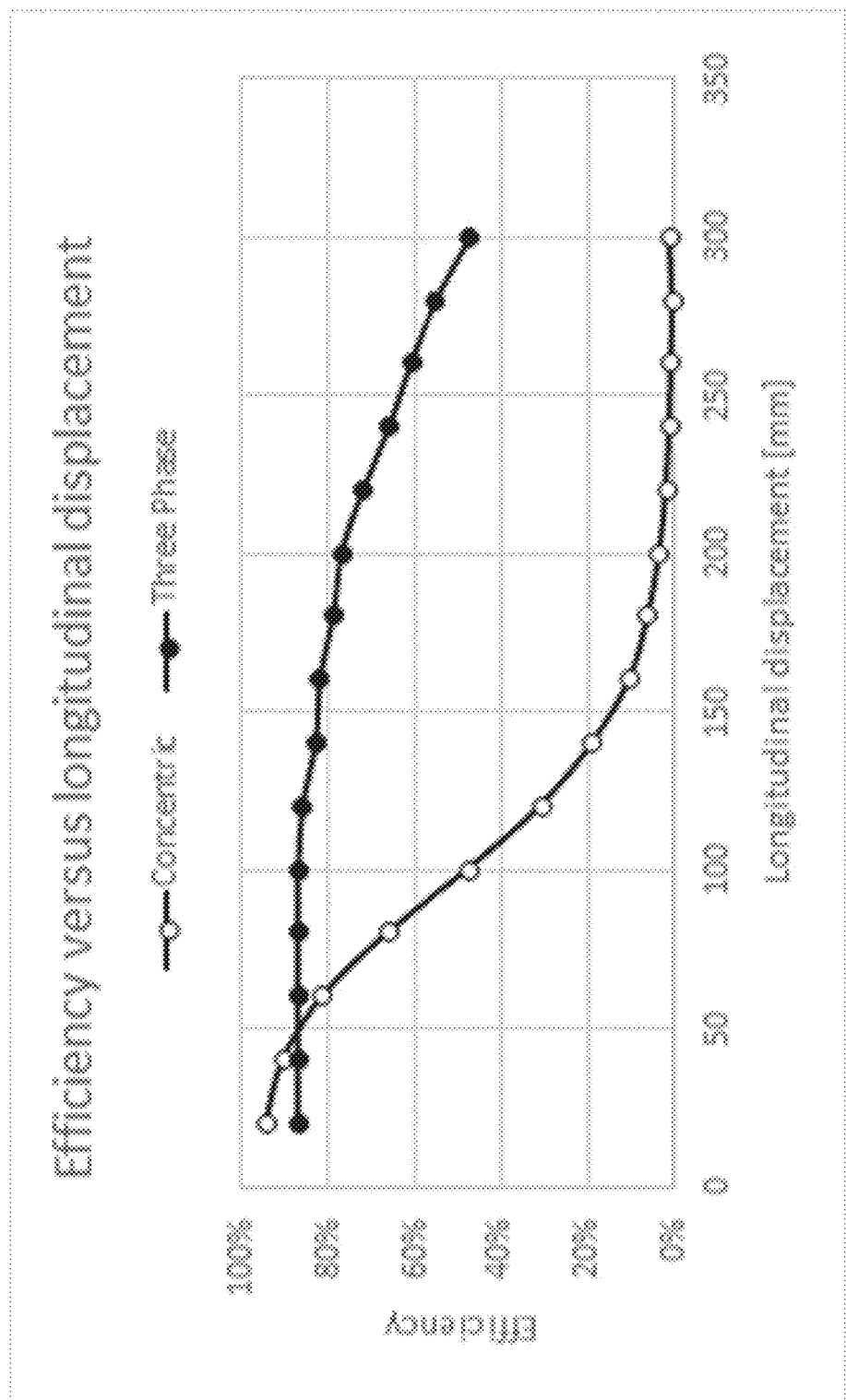
FIG. 18 is a graph of RF efficiency of the wireless power transfer system of FIG. 12 and another wireless power transfer system as a function of longitudinal separation between the transmit and receive resonators.

FIG. 18 is a graph of the RF efficiency of the wireless power transfer system 1500 and the wireless power transfer system 70 described in U.S. Pat. No. 9,979,206 issued on May 22, 2018, the relevant portions of which are incorporated herein by reference, at a resonant frequency of 13.56 MHz as a function of longitudinal separation between the transmit and receive resonators.

The wireless power transfer system 70 has transmit and receive resonators that each comprise two disc capacitive electrodes, an outer capacitive electrode and an inner capacitive electrode. The outer capacitive electrode has an outer radius $R_{out}$ equal to 150 mm and an inner radius $R_{in}$ equal to 120 mm. The inner capacitive electrode has an outer radius $r_{out}$ equal to 110 mm and an inner radius $r_{in}$ equal to 80 mm. The inductors of the transmit and receive resonators each have an inductance of 7.37 μH. The wireless power transfer systems 70 and 1500 are tuned to maximize RF efficiency with a longitudinal separation of 300 mm between transmit and receive resonators.

The wireless power transfer 70 is identified as "Concentric" and the wireless power transfer system 1500 is identified as "Three-Phase" in FIG. 18. As shown in FIG. 18, the wireless power transfer system 1500 has a higher RF efficiency at longitudinal separations over approximately 50 mm. The wireless power transfer system 70 has a higher RF efficiency at longitudinal separations less than approximately 50 mm. However, this higher RF efficiency at longitudinal separations less than approximately 50 mm is only an approximately 10% increase.

Figure 19:
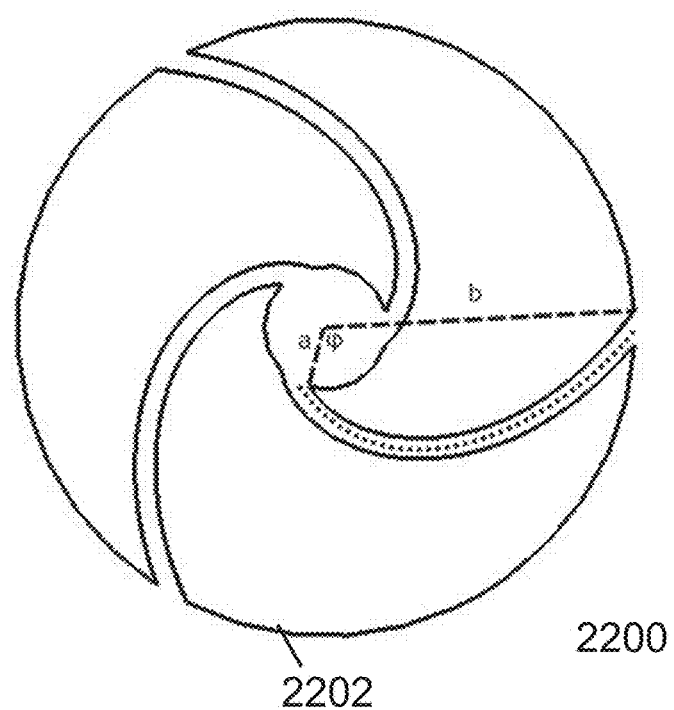
FIG. 19 is a plan view of another embodiment of the transmit capacitive electrodes of the wireless power transfer system of FIG. 5A.

While the transmit capacitive electrodes 516 have been described as having a particular configuration, one of skill in the art will appreciate that other configurations are possible. FIG. 19 shows another embodiment of the transmit capacitive electrodes 516 generally identified by reference numeral 2200. In this embodiment, the transmit capacitive electrodes 2200 comprise three segments 2202. In this embodiment, the segments 2202 are plates. The segments 2202 are coplanar. The segments 2202 are identically sized. The segments 2202 are spaced apart such that they generally form a circle about their circumferences. Each segment 2202 spans approximately 120 degrees of the circle. The segments 2202 are equally spaced around a central point within a plane.

In this embodiment, the segments 2202 are separated by a logarithmic spiral gap, represented by a dotted line in FIG. 19 and described by Equation 3 below:

$$r(\beta) = \left(\frac{a}{b}\right)^{\frac{\beta}{\phi}} \quad \text{(Equation 3)}$$

In Equation 3, r(β) is the radius of the spiral for a rotation angle β, a is the inside radius, b is the outside radius, and φ is the angle swept by the curve.

The transmit capacitive electrodes 2200 provide a more constant input impedance to reduce variation in the output power and present more favourable conditions to the RF converter 508 compared with the transmit capacitive electrodes 1400.

While the transmit capacitance electrodes 2200 have been described, one of skill in the art will appreciate that the receive capacitive electrodes 522 may be similarly configured.

Figure 20:
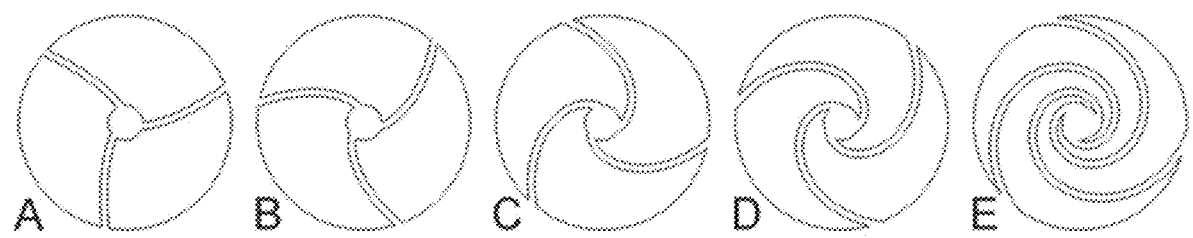
FIG. 20 is a plan view of other embodiments of the transmit capacitive electrodes of FIG. 19.

FIG. 20 shows other embodiments of the transmit capacitive electrodes 2200 for various values of the angle swept by the curve φ. In particular, the following values have been used: A: φ=30; B: φ=60; C: φ=120; D: φ=180; and E: φ=360 degrees.

Figure 21:
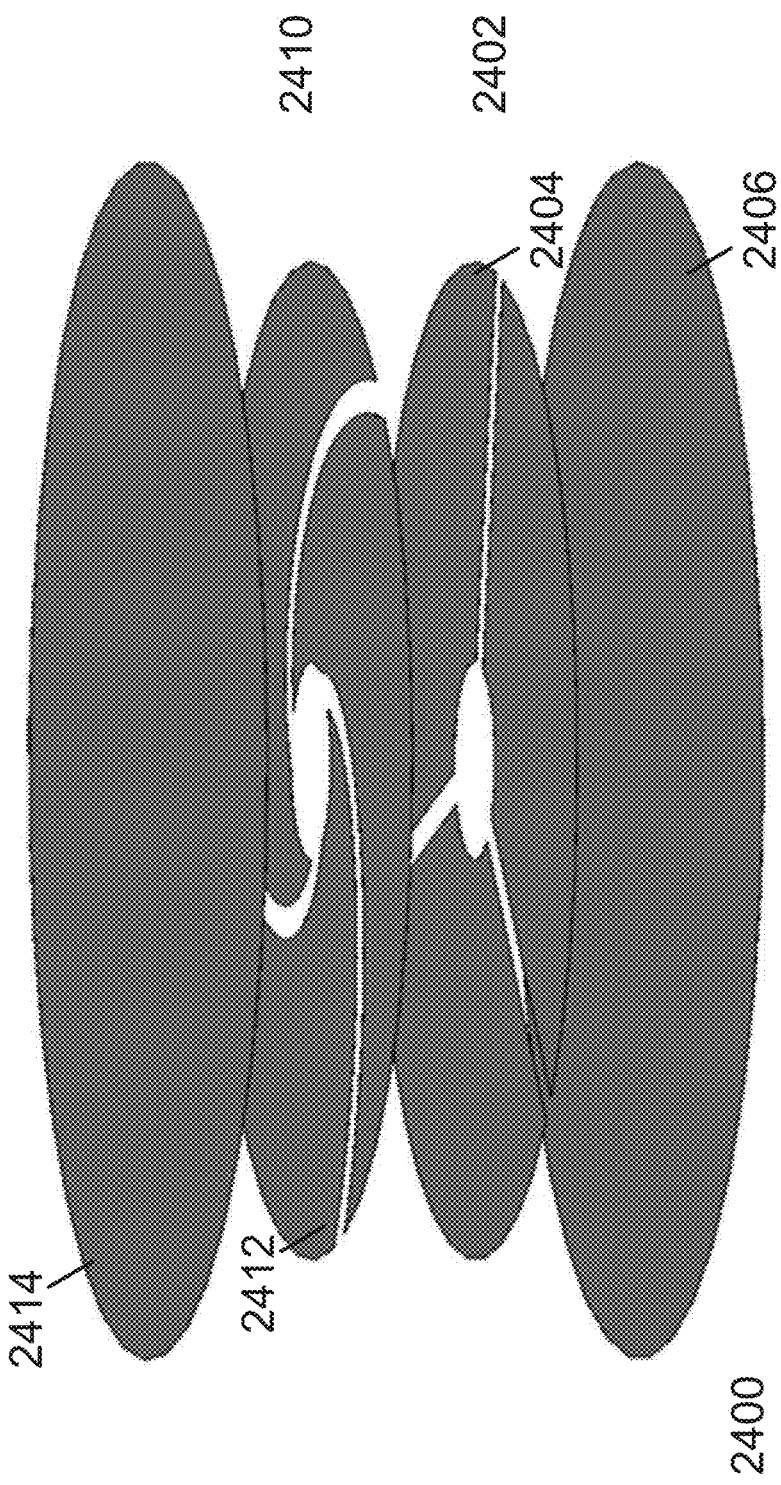
FIG. 21 is a perspective view of a wireless power transfer system in accordance with an aspect of the disclosure.

While the wireless power transfer system 500 has been described, one of skill in the art will appreciate that other configurations are possible. FIG. 21 shows a partial wireless power transfer system generally identified by reference numeral 2400. The wireless power transfer 2400 comprises a transmitter and a receiver. The transmitter is identical to the previously described transmitter 502 unless otherwise stated. The receiver is identical to the previously described receiver 504 unless otherwise stated.

In this embodiment, the multi-phase transmit resonator 512 comprises transmit capacitive electrodes 2402. The transmit capacitive electrodes 2402 comprise three transmit segments 2404. In this embodiment, the transmit segments 2404 are plates. The transmit segments 2404 are coplanar. The transmit segments 2404 are identically sized. The transmit segments 2404 are spaced apart such that they generally form a circle about their circumferences. Each transmit segment 2404 spans approximately 120 degrees of the circle. The transmit segments 2404 are equally spaced around a central point within a plane. The transmit segments 2404 have an axis of a three-fold rotational symmetry normal to the major face of the transmit segments 2404 about the centre of curvature of the transmit segments 2404. Each transmit segment 2404 is paired with an inductor 514 ensuring that the multi-phase transmit resonator 512 is configured to resonate at the resonant frequency of the multi-phase transmit resonator 512. The inductors 514 of the multi-phase transmit resonator 512 are identical. Given the symmetrical positioning of the transmit segments 2404, the multi-phase transmit resonator 512 is balanced.

In this embodiment, each transmit segment 2404 has an outer radius b of 150 mm, an inner radius a of 30 mm, a thickness of 0.1 mm. Each transmit segment 2404 is separated from the adjacent transmit segment 2404 by a 10 mm gap.

In this embodiment, the multi-phase transmit resonator 512 further comprises a transmit passive electrode 2406. The transmit passive electrode 2406 is described in U.S. patent application Ser. No. 16/138,344 filed on Sep. 21, 2018, the relevant portions of which are incorporated herein by reference. In this embodiment, the transmit passive electrode 2406 comprises a planar disc. The transmit passive electrode 2406 is parallel with the transmit capacitive electrodes 2402. The transmit passive electrode 2406 is larger in area than the total area of the transmit capacitive electrodes 2402. The centre of the transmit passive electrode 2406 is aligned with the central point of the transmit capacitive electrodes 2402. The transmit passive electrode 2406 is 50 mm from the transmit capacitive electrodes 2402.

In this embodiment, the multi-phase receive resonator 520 comprises receive capacitive electrodes 2410. The receive capacitive electrodes 2410 comprise three receive segments 2412. In this embodiment, the receive segments 2412 are plates. The receive segments 2412 are coplanar. The receive segments 2412 are identically sized. The receive segments 2412 are spaced apart such that they generally form a circle about their circumferences. Each receive segment 2412 spans approximately 120 degrees of the circle. The receive segments 2412 are equally spaced around a central point within a plane. The receive segments 2412 have an axis of a three-fold rotational symmetry normal to the major face of the receive segments 2412 about the centre of curvature of the receive segments 2412. Each receive segment 2412 is paired with an inductor 524 ensuring that the multi-phase receive resonator 520 is configured to resonate at the resonant frequency. The inductors 524 of the multi-phase receive resonator 520 are identical. Given the symmetrical positioning of the transmit segments 2404, the multi-phase receive resonator 520 is balanced.

In this embodiment, each receive segment 2412 has an outer radius b of 150 mm, an inner radius a of 30 mm, a thickness of 0.1 mm and an angle swept by the curve φ of 120 degrees. Each receive segment 2412 is separated from the adjacent receive segment 2412 by a 10 mm gap.

In this embodiment, the multi-phase transmit resonator 512 further comprises a receive passive electrode 2414. The receive passive electrode 2414 is described in U.S. patent application Ser. No. 16/138,344 filed on Sep. 21, 2018, the relevant portions of which are incorporated herein by reference. In this embodiment, the receive passive electrode 2414 comprises a planar disc. The receive passive electrode 2414 is coplanar with the receive capacitive electrodes 2412. The receive passive electrode 2414 is larger in area than the total area of the receive capacitive electrodes 2412. The centre of the receive passive electrode 2414 is aligned with the central point of the receive capacitive electrodes 2412. The receive passive electrode 2414 is 50 mm from the receive capacitive electrodes 2412.

The transmit capacitive electrodes 2402 and receive capacitive electrodes 2410 are 50 mm away each other. The transmit capacitive electrodes 1502 and receive capacitive electrodes 1510 have a common axis of three-fold rotational symmetry. As both the multi-phase transmit and receive resonators 512 and 520 are balanced, the wireless power transfer system 1500 is also balanced.

The passive electrodes 2406 and 2414 may reduce coupling due to the added current return path provided by mutual capacitances between the active electrodes (i.e. transmit capacitive electrodes 2402 and receive capacitive electrodes 2410) and the passive electrodes 2406 and 2414, however, the passive electrodes 2406 and 2414 may provide benefits. For example, the passive electrodes 2406 and 2414 may add capacitances which reduce both inductance requirements and the reflected impedance, thus lowering voltages at the passive electrodes 2406 and 2414. Environmental sensitivity and field emissions may also be reduced. Furthermore, a low-field region opposite the passive electrodes 2406 and 2414 relative to the active electrodes may be suitable for mounting electronics.

The RF efficiency, real part of the impedance, and imaginary part of the impedance of the wireless power transfer system 2400 are numerically described by using the modelling parameters in Table 3 below in Equation 2. The real and imaginary parts of the impedance of the wireless power transfer system 2400 are the components of the input impedance of the wireless power transfer system 2400.

TABLE 3

|  | $\bar{g}$ | AMP | $\xi$ |
| --- | --- | --- | --- |
| RF Efficiency | 94.10 +/− 0.04% | 1.09 +/− 0.05% | 113 +/− 3 degrees |
| Real Part of the Impedance | 117.0 +/− 0.6 Ω | 42.3 +/− 0.9 Ω | 114 +/− 1 degrees |
| Imaginary Part of the Impedance | 0.3 +/− 0.5 Ω | 3.9 +/− 0.6 Ω | 109 +/− 10 degrees |

Simulations were performed to determine the performance of the wireless power transfer system 2400 compared with the wireless power transfer system 1500. The modeling parameters for the RF efficiency, real part of the impedance presented at each capacitive electrode of the respective wireless power transfer systems 2400 and 1500, and imaginary part of the impedance presented at each capacitive electrode of the respective wireless power transfer systems 2400 and 1500 are provided in Tables 3 and 4 above.

The amplitude of the real part of the impedance of the wireless power transfer system 2400 is 36% of the mean value g. This represents a significant reduction in impedance variation compared to the wireless power transfer system 1500. Furthermore, as shown in Tables 2 and 3, the mean and amplitude of the imaginary part of the impedance of each transmit capacitive electrode 2302 of the wireless power transfer system 2400 is much less than the amplitude of the imaginary part of the impedance of each transmit capacitive electrode 1502 of the wireless power transfer system 1500. This indicates a much more favourable impedance seen by the RF converter 508.

Further simulations were performed to determine the performance of the wireless power transfer system 2400 compared with the wireless power transfer system 1500 when varying the angle swept by the curve ϕ. Generally, increasing the angle swept by the curve ϕ decreases the mean RF efficiency (g fitting parameter) while increasing the amplitude of efficiency variation under rotation (AMP fitting parameter), decreases the mean and amplitude of the real part of the impedance, decreases the mean and amplitude of the imaginary part of the impedance, and decreases the required inductance of the wireless power transfer system 2400. Simulations determined that an angle swept by the curve ϕ between 120 degrees and 180 degrees yielded the best overall wireless power transfer system performance.

While multi-phase resonators have been described with three capacitive electrodes, one of skill in the art will appreciate that more capacitive electrodes are possible. FIGS. 22A to 22E show other embodiments of capacitive electrodes for use in the multi-phase transmit or receive resonators 310 and 312, respectively. Specifically, FIG. 22A shows three capacitive electrodes arranged in a circle as previously described; FIG. 22B shows four capacitive electrodes arranged in a circle; FIG. 22C shows five capacitive electrodes arranged in a circle; FIG. 22D shows six capacitive electrodes arranged in a circle; and FIG. 22E shows twelve capacitive electrodes arranged in a circle.

Furthermore, while multi-phase resonators have been described as having capacitive electrodes of particular shapes and configurations, one of skill in the art will appreciate that other shapes and configurations are possible. FIGS. 23A to 23 show other embodiments of capacitive electrodes for use in the multi-phase transmit or receive resonators 512 and 520, respectively. Specifically, FIG. 23A shows capacitive electrodes comprising three equally sized segments of a flat disc spaced apart by channels.

FIGS. 23B and 23C show capacitive electrodes formed from a flat disc with an inner radius a, an outer radius b and channels cut 360/n degrees apart. In this embodiment n is three. The channels extend from the inner radius a to the outer radius b along spiral paths. In this embodiment, the spiral paths are logarithmic. FIG. 23B shows capacitive electrodes with the spiral paths arranged in a counter-clockwise fashion. FIG. 23C shows capacitive electrodes with the spiral paths arranged in a clockwise fashion.

FIG. 23D shows capacitive electrodes identical to the previously described capacitive electrodes 1400 shown in FIG. 11.

FIGS. 23E and 23F show capacitive electrodes formed from a flat disc with an inner radius a, an outer radius b and channels cut 360/n degrees apart. In this embodiment n is three. The channels extend from the inner radius a to the outer radius b along spiral paths. In this embodiment, the spiral paths are Archimedean. In another embodiment, the spirals are hyperbolic.

FIGS. 23G and 23H show capacitive electrodes formed from a flat disc with an inner radius a, an outer radius b and channels cut 360/n degrees apart. In this embodiment n is three. The channels extend from the inner radius a to the outer radius b along a straight tangential path of the circle formed by the capacitive electrodes.

FIG. 23I shows capacitive electrodes formed from planar rectangular plates spaced equidistant from each other, and formed in a circle such that the plates are aligned with the centre of the circle and extend outwardly therefrom.

While the capacitive electrodes of FIGS. 23A to 23I have been described with three capacitive electrodes, one of skill in the art will appreciate that more capacitive electrodes may be possible. Furthermore, one of skill in the art will appreciate that the capacitive electrodes shown in FIGS. 23A to 23I may be used in both or only one of the multi-phase transmit and receive resonators.

Figure 24A:
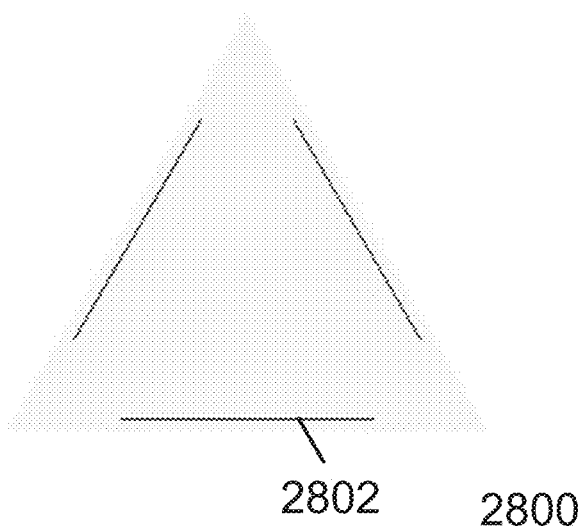
FIG. 24A is a side elevation view of another embodiment of the capacitive electrodes of the wireless power transfer system of FIG. 5.
Figure 24B:
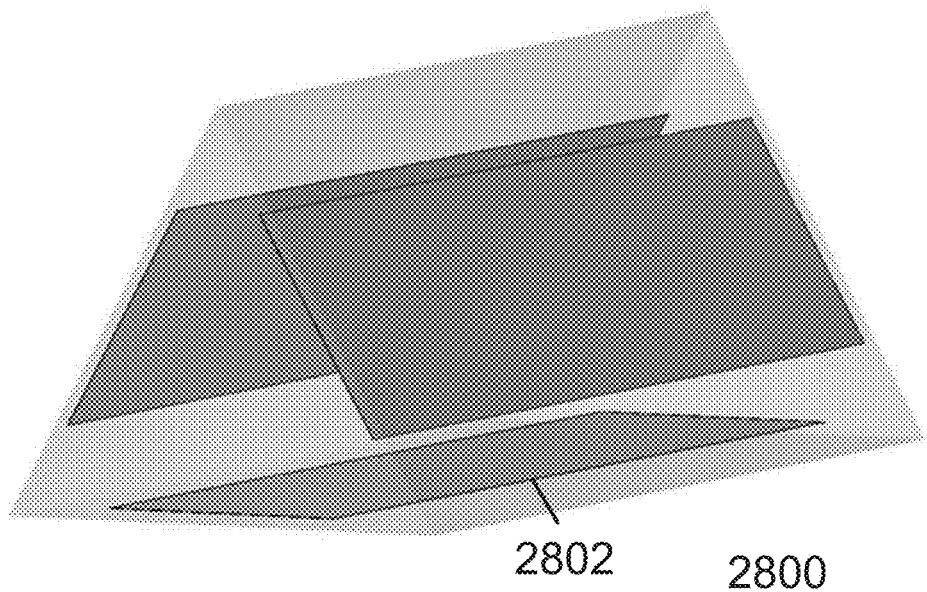
FIG. 24B is a perspective view of the capacitive electrodes of FIG. 24A.

While multi-phase resonators have been described as having capacitive electrodes of particular shapes and configurations, one of skill in the art will appreciate that other shapes and configurations are possible. FIG. 24A is a side elevation view of another embodiment of capacitive electrodes of the wireless power transfer system 500 generally identified by reference numeral 2800. FIG. 24B is perspective view of the capacitive electrodes 2800. Each capacitive electrode 2800 is a rectangular planar plate 2802. The plates 2802 are arranged at 120 degree angles to each other in the vertical plane as shown in FIG. 24A. The plates 2802 form a triangular prism at their periphery as shown in FIG. 24B.

Figure 25A:
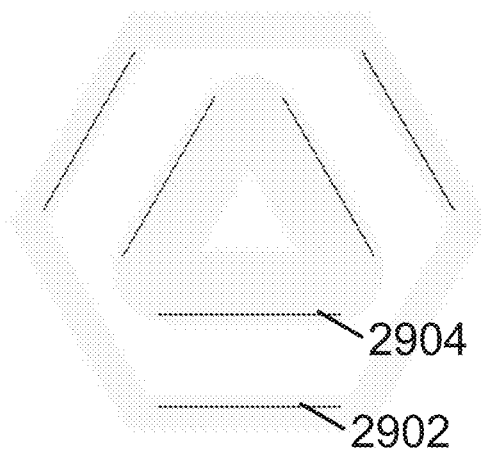
FIG. 25A is a side elevation view of the capacitive electrodes of FIG. 24A forming transmit and receive capacitive electrodes.
Figure 25B:
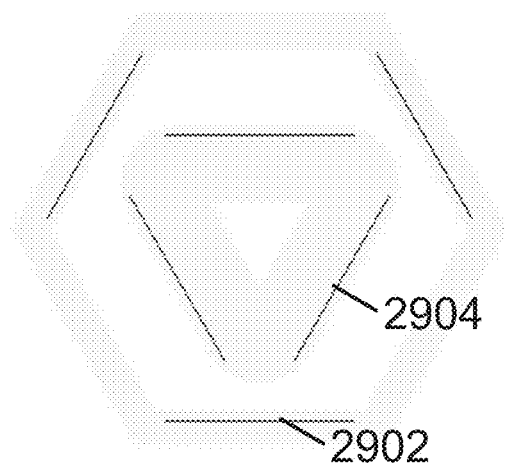
FIG. 25B is a side elevation view of the capacitive electrodes of FIG. 24A forming another embodiment of transmit and receive capacitive electrodes.

The plates 2802 may form part of at least one of the multi-phase transmit resonator 510 and the receive resonator 520. FIG. 25A is a side elevation view of the plates 2802 forming transmit capacitive electrodes 2902 of the multi-phase transmit resonator 510 and the plates 2802 forming receive capacitive electrodes 2904 of the multi-phase receive resonator 520. In this embodiment, the triangular prism formed at the periphery of the transmit capacitive electrodes 2902 encompass the triangular prism formed at the periphery of the receive capacitive electrodes 2904. In this embodiment, the triangular prisms formed at the periphery of the capacitive electrodes 2902 and 2904 have identical orientations. FIG. 25B is a side elevation view of the capacitive electrodes 2902 and 2904 such that the triangular prism formed by the receive capacitive electrodes 2904 is inverted relative to the triangular prism formed by the transmit capacitive electrodes 2902.

Figure 26:
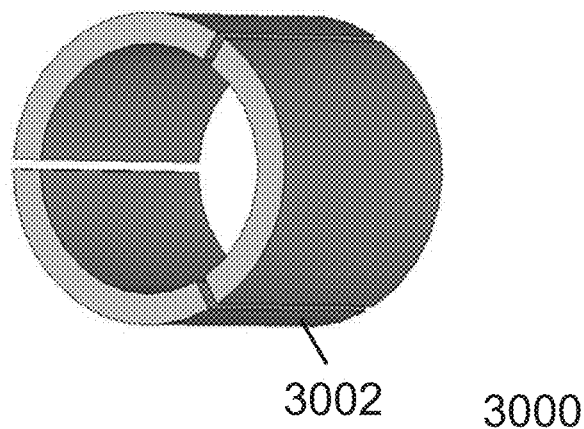
FIG. 26 is a perspective view of another embodiment of the capacitive electrodes of the wireless power transfer system of FIG. 5.

While multi-phase resonators have been described as having capacitive electrodes of particular shapes and configurations, one of skill in the art will appreciate that other shapes and configurations are possible. FIG. 26 is a perspective view of another embodiment of the capacitive electrodes of the wireless power transfer system 500 generally identified by reference numeral 3000. In this embodiment, the capacitive electrodes 3000 comprise three segments 3002 that form a hollow tube. Each segment 3002 has identical dimensions.

Figure 27:
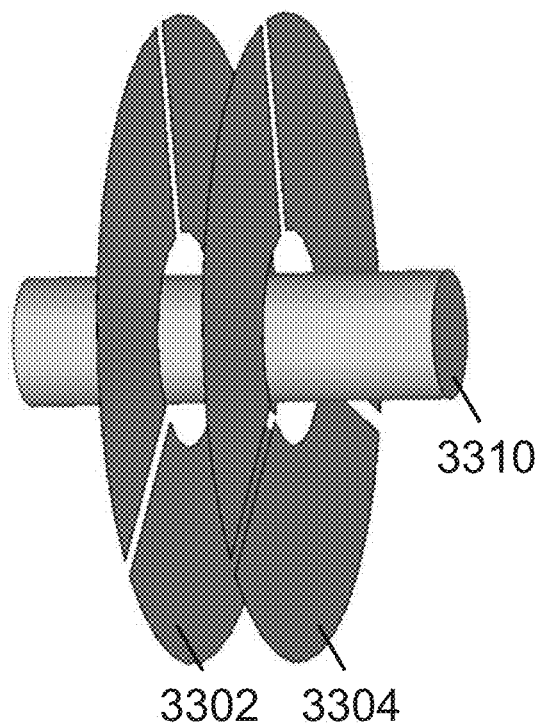
FIG. 27 is a perspective view of another embodiment of the capacitive electrodes of the wireless power transfer system of FIG. 5.

While multi-phase resonators have been described as having capacitive electrodes of particular shapes and configurations, one of skill in the art will appreciate that other shapes and configurations are possible. FIG. 27 is a perspective view of another embodiment of the capacitive electrodes of the wireless power transfer system 500 generally identified by reference numeral 3300. The capacitive electrodes 3300 are identical to the previously described segments 1402 unless otherwise stated. In this embodiments, the capacitive electrodes 3300 comprise transmit segments 3302 that form the transmit capacitive electrodes 516 of the multi-phase transmit resonator 512 and receive segments 3304 that form the receive capacitive electrodes 522 of the multi-phase receive resonator 520. The segments 3302 and 3304 are arranged around an axle 3310 such that the axle passes through the central points in the circles formed by the segments 3302 and 3304. In this embodiment, the axle 3310 has a radius of 30 mm. The segments 3302 and 3304 have an inner axial displacement from the axle 3310 of 20 mm. The segments 3302 and 3304 have an outer axial displacement from the axle 3310 of 120 mm. In simulations of the wireless power transfer system 500 with the segments 3302 and 3304 with an angular position θ of 0 degrees, the RF efficiency of the wireless power transfer system 500 was found to be 87%.

Figure 28A:
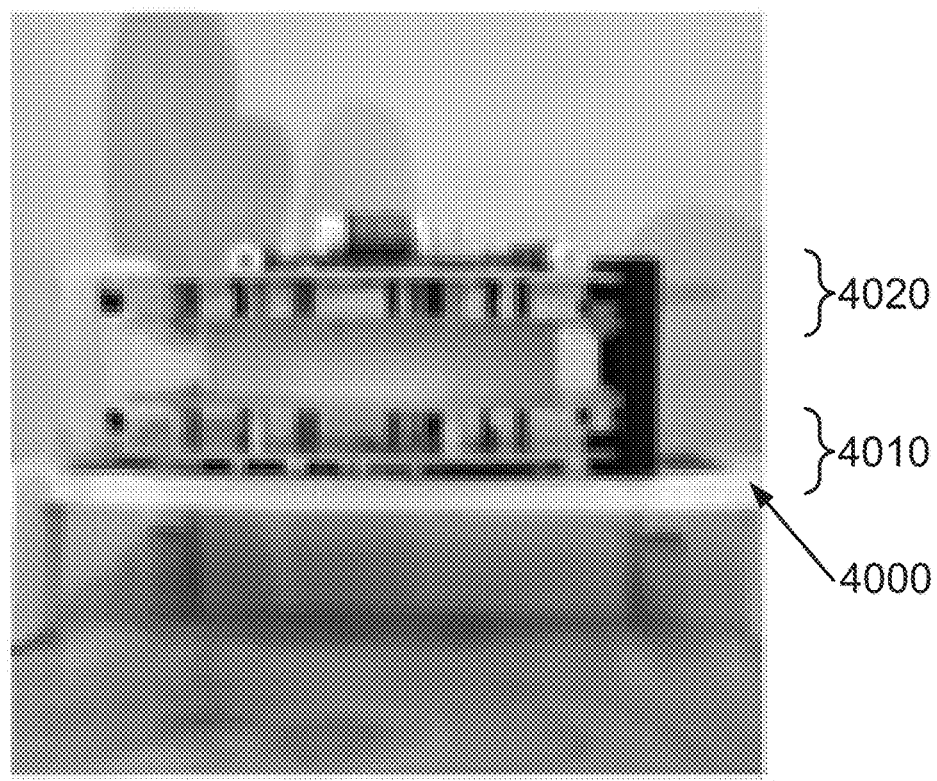
FIG. 28A is a side elevation view of a wireless power transfer system in accordance with an aspect of the disclosure.
Figure 28B:
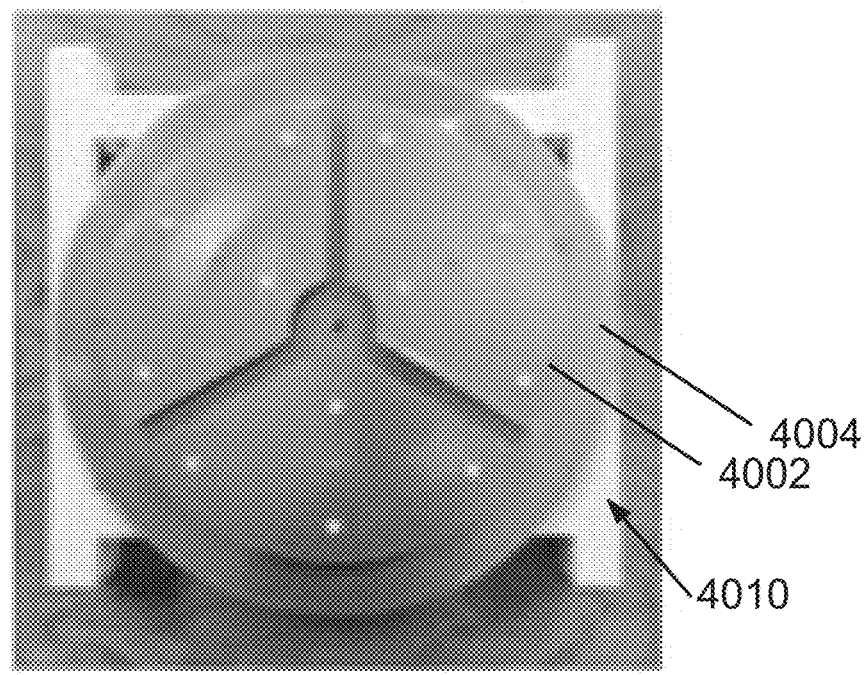
FIG. 28B is a plan view of the wireless power transfer system of FIG. 28A.
Figure 28C:
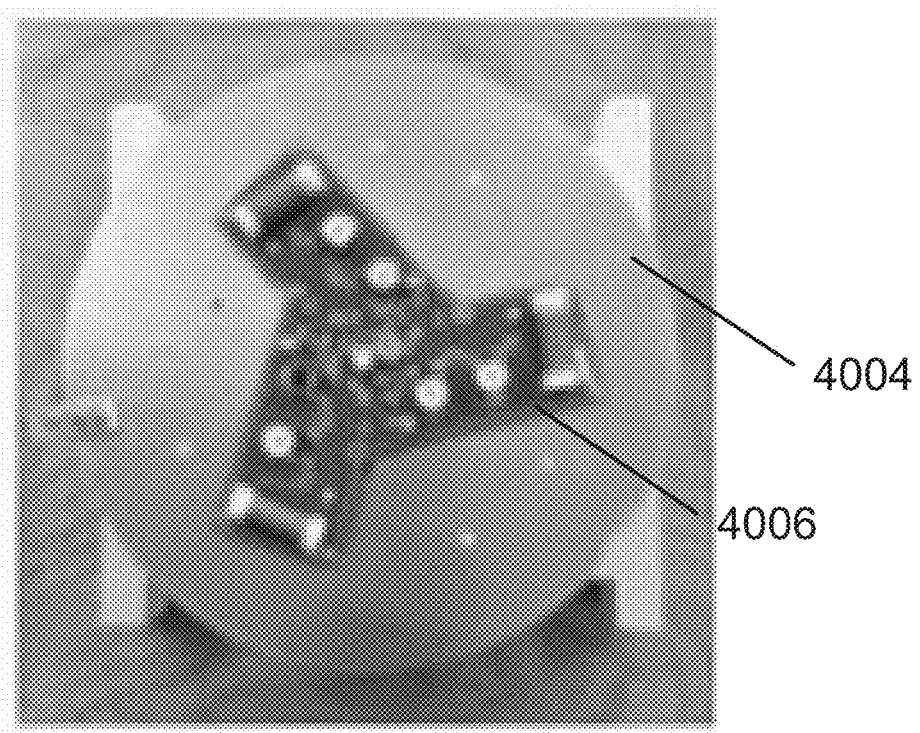
FIG. 28C is another plan view of the wireless power transfer of FIG. 28A.

An experimental wireless power transfer system 4000 was constructed and is shown in FIGS. 28A to 28C. As shown in FIG. 28A, the wireless power transfer system 4000 comprises a transmitter 4010 and a receiver 4020. The transmitter 4010 and receiver 4020 are identical to the described transmitter 502 and receiver 504, respectively, unless otherwise stated. Components of the wireless power transfer system 4000, such as the power source and load are not shown in FIGS. 28A to 28C.

The transmitter 4010 and receiver 4020 are configured identically. Accordingly, for ease of explanation only the transmitter 4010 will be described. As clearly depicted in FIGS. 28A and 28B, the transmitter 4010 comprises three (3) capacitive electrodes 4002 and a passive electrode 4004 positioned opposite the capacitive electrodes 4002 with respect to the receiver 4020. The required electronics for the transmitter 4010 are positioned on side of the passive electrode 4004 opposite the capacitive electrodes 4002 as emission are minimized due to the passive electrode 4004. In this embodiment, the electronics are present on a printed circuit board (PCB) 4006.

In this experimental wireless power transfer system 4000, the electrodes 4002 and 4004 were cut from aluminum. The outer and inner radii of the capacitive electrodes 4002 was 100 mm and 20 mm, respectively. The separation distance between the transmitter 4010 and receiver 4020 was uniformly 25 mm. The separation distance between the transmitter 4010 and passive electrode 4004 was uniformly 10 mm.

Figure 29A:
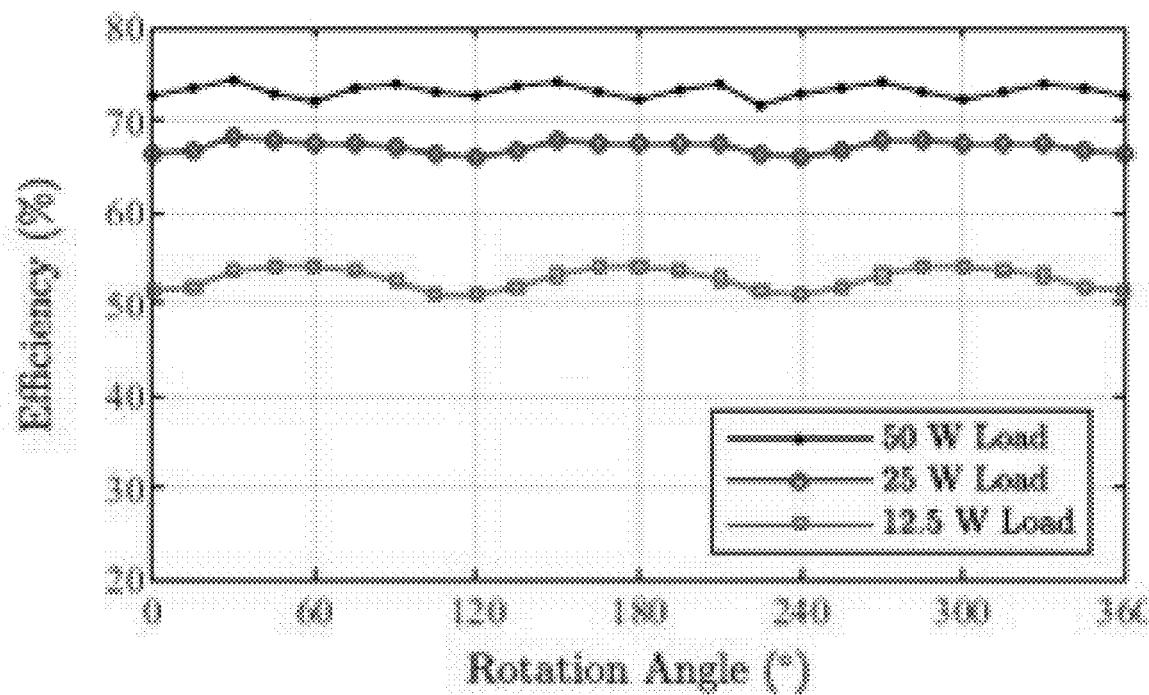
FIG. 29A is a graph of the radio frequency (RF) efficiency of the wireless power transfer system of FIG. 29A as a function of angular rotation.
Figure 29B:
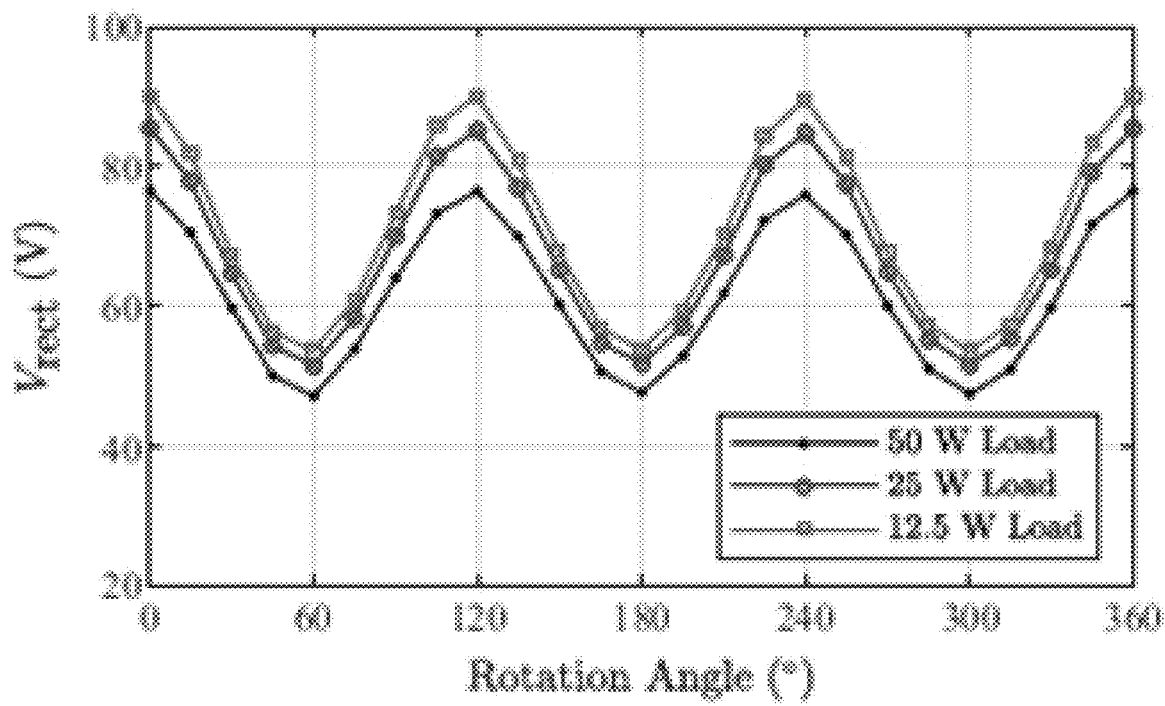
FIG. 29B is a graph of the received rectified voltage of the wireless power transfer system of FIG. 29A as a function of angular rotation.

Experimental data was collected with respect to the system 400 to determine system performance. In particular, RF efficiency and received rectified voltage were determined as a function of rotation angle for a variety of loads, e.g. 50 W, 25 W and 12.5 W. Turning now to FIGS. 29A and 29B, the results of these experiments are depicted.

FIG. 29A is a graph of the RF efficiency of the wireless power transfer system 4000 as a function of angular rotation. The RF efficiency is depicted at various loads (50 W, 25 W and 12.5 W). As the load is reduced, a more pronounced sensitivity to rotation is observed in the efficiency. At 12.5 W, efficiency minima occur at multiples of 120 due to increased losses from diode commutation and inverter hard-switching. Power transfer to a 50 W load across the 25 mm transmission gap is shown to be possible with an average end-to-end efficiency of 73% over full rotation.

FIG. 29B is a graph of the rectified voltage ($V_{rect}$) of the wireless power transfer system 4000 as a function of angular rotation. In particular, $V_{rect}$ is the unregulated rectified voltage received at the receiver 4020. Similar to FIG. 29A, the rectified voltage is depicted as various loads (50 W, 25 W and 12.5 W). On average, the ratio between the maximum and minimum $V_{rect}$ is found to be approximately 1.66. While the transmit capacitive electrodes 406 have been described as having a particular configuration, one of skill in the art will appreciate that other configurations are possible. In another embodiment, the transmit capacitive electrodes 406 are multi-fold rotationally symmetric. An axis of the multi-fold rotational symmetry is normal to a major face of the capacitive electrodes 406 about a centre of curvature of the capacitive electrodes 406. While the transmit capacitance electrodes 406 have been described, one of skill in the art will appreciate that the receive capacitive electrodes 410 may be similarly configured.

While particular wireless power transfer systems have been described, one of skill in the art will appreciate that other configurations are possible. The wireless power transfer systems may further comprise at least one of a transmit passive and a receive passive electrode. The passive electrodes are described in U.S. patent application Ser. No. 16/138,344 filed on Sep. 21, 2018, the relevant portions of which are incorporated herein by reference.

Although embodiments have been described above and are shown in the accompanying drawings, it will be appreciated by one of skill in the art that variations and modifications may be made without departing from the scope as defined by the appended claims, and the scope of the claims should be given the broadest interpretation consistent with the specification as a whole.

What is claimed is:

1. A transmitter comprising:
   a multi-phase radio-frequency (RF) converter configured to output multiple sinusoidal RF power signals; and
   a multi-phase resonator configured to receive the multiple sinusoidal RF power signals and resonate multiple inductors and capacitive electrodes at a resonant frequency at multiple phases to wirelessly transfer power via resonant electric field coupling.

2. The transmitter of claim 1, wherein the capacitive electrodes are multi-fold rotationally symmetric.

3. The transmitter of claim 2, wherein an axis of the multi-fold rotational symmetry is normal to a major face of the capacitive electrodes about a centre of curvature of the capacitive electrodes.

4. The transmitter of claim 1, wherein the multi-phase RF converter comprises a multi-phase RF inverter comprising multiple transistors, each transistor electrically connected to an inductor of the multi-phase transmit resonator.

5. The transmitter of claim 1, wherein the multi-phase transmit resonator is balanced.

6. A receiver comprising:
a multi-phase resonator comprising n pairs of inductors and capacitive electrodes configured to resonate at a same resonant frequency to wirelessly extract power via resonant electric field coupling and output multiple sinusoidal radio-frequency (RF) power signals having a same amplitude and frequency, and shifted out of phase with each other, where n is a positive integer greater than one; and
a multi-phase rectifier configured to receive the multiple sinusoidal RF power signals and output a direct current (DC) power signal.

7. The receiver of claim 6, wherein the capacitive electrodes are multi-fold rotationally symmetric.

8. The transmitter of claim 7, wherein an axis of the multi-fold rotational symmetry is normal to a major face of the capacitive electrodes about a centre of curvature of the capacitive electrodes.

9. The receiver of claim 6, wherein the multi-phase rectifier comprises multiple pairs of diodes, each pair of diodes electrically connected to an inductor of the multi-phase receive resonator.

10. The receiver of claim 6, wherein the multi-phase receive resonator is balanced.

11. A system comprising:
a transmitter comprising:
a multi-phase radio-frequency (RF) converter configured to output multiple sinusoidal RF power signals; and
a multi-phase transmit resonator configured to receive the multiple sinusoidal RF power signals and resonate multiple transmit inductors and transmit capacitive electrodes at a resonant frequency at multiple phases to wirelessly transfer power via resonant electric field coupling; and
a receiver comprising:
a multi-phase receive resonator comprising multiple receive inductors and receive capacitive electrodes configured to resonate at the resonant frequency to wirelessly extract power via resonant electric field coupling and output the multiple sinusoidal RF power signals, wherein the multiple receive inductors and receive capacitive electrodes resonate at the multiple phases; and
a multi-phase rectifier configured to receive the multiple sinusoidal RF power signals and output a direct current (DC) power signal.

12. The system of claim 11, at least one of:
wherein the transmit capacitive electrodes are multi-fold rotationally symmetric, and
wherein the receive capacitive electrodes are multi-fold rotationally symmetric.

13. The system of claim 12, wherein an axis of the multi-fold rotational symmetry is normal to a major face of the capacitive electrodes about a centre of curvature of the capacitive electrodes.

14. The system of claim 11, wherein the multi-phase RF converter comprises a multi-phase RF inverter comprising multiple transistors, each transistor electrically connected to an inductor of the multi-phase transmit resonator.

15. The system of claim 11, wherein at least one of the multi-phase transmit resonator is balanced, and the multi-phase receive resonator is balanced.

16. The system of claim 11, wherein the multi-phase rectifier comprises multiple pairs of diodes, each pair of diodes electrically connected to an inductor of the multi-phase receive resonator.

17. A method of wirelessly transmitting power via electric field coupling, the method comprising:
converting, at a multi-phase radio-frequency (RF) converter of a transmitter comprising:
the multi-phase radio-frequency (RF) converter configured to output multiple sinusoidal RF power signals; and
a multi-phase resonator configured to receive the multiple sinusoidal RF power signals and resonate multiple inductors and capacitive electrodes at a resonant frequency at multiple phases to wirelessly transfer power via resonant electric field coupling, an input power signal into multiple sinusoidal RF power signals;
receiving the multiple sinusoidal RF power signals at the multi-phase resonator of the transmitter;
resonating a transmit inductor and capacitive electrode pair of the multi-phase resonator of the transmitter to generate an electric field; and
wirelessly extracting power by the multi-phase RF resonator of a receiver, the multi-phase RF resonator of the receiver positioned within the generated electric field.

18. The method of claim 17, further comprising:
outputting received sinusoidal RF power signals to the multi-phase rectifier of the receiver; and
rectifying the received sinusoidal RF power signals to a rectified signal.

19. The method of claim 17, wherein resonating the transmit inductor and capacitive electrode pair comprises:
resonating the pair at a resonant frequency of the multi-phase resonator of the transmitter.

20. The method of claim 17, wherein resonating the transmit inductor and capacitive electrode pair comprises resonating an $i^{th}$ transmit inductor and capacitive electrode pair at an $(i-1)*360/n$, where n is a number of sinusoidal RF power signals.

* * * * *